United States Patent
Hokkezu et al.

(10) Patent No.: US 8,953,090 B2
(45) Date of Patent: Feb. 10, 2015

(54) CAMERA DEVICE, INTERCHANGEABLE LENS DEVICE, CAMERA MAIN BODY, AND FOCUS CONTROL METHOD

(75) Inventors: Takeru Hokkezu, Hachioji (JP); Shinya Abe, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 14/129,861

(22) PCT Filed: Feb. 28, 2012

(86) PCT No.: PCT/JP2012/054988
§ 371 (c)(1),
(2), (4) Date: Mar. 20, 2014

(87) PCT Pub. No.: WO2013/001853
PCT Pub. Date: Jan. 3, 2013

(65) Prior Publication Data
US 2014/0247384 A1 Sep. 4, 2014

(30) Foreign Application Priority Data
Jun. 29, 2011 (JP) .................. 2011-144902

(51) Int. Cl.
*H04N 5/232* (2006.01)
*H04N 5/76* (2006.01)
(Continued)

(52) U.S. Cl.
CPC ............... *H04N 5/2254* (2013.01); *G02B 7/36* (2013.01); *H04N 5/23209* (2013.01);
(Continued)

(58) Field of Classification Search
USPC ........... 348/208.12, 241, 345, 346, 347, 348, 348/349, 350, 351, 352, 353, 354, 355, 356, 348/357, 360, 361, 231.3, 231.4
See application file for complete search history.

(56) References Cited

U.S. PATENT DOCUMENTS

2006/0140613 A1* 6/2006 Aikawa ........................ 396/133
2010/0110278 A1* 5/2010 Higurashi ..................... 348/361
(Continued)

FOREIGN PATENT DOCUMENTS

JP 2006-065176 3/2006
JP 2010-107725 5/2010
(Continued)

OTHER PUBLICATIONS

International Preliminary Report on Patentability to PCT/JP2012/054988.
(Continued)

*Primary Examiner* — Twyler Haskins
*Assistant Examiner* — Peter Chon
(74) *Attorney, Agent, or Firm* — John C. Pokotylo; Straub & Pokotylo

(57) ABSTRACT

A lens controller of a camera device includes: a driving amount calculator that samples, for each first time period, a lens position signal indicating a lens position detected by a lens position detector and a target position signal indicating a target position of a focus lens on an optical axis transmitted from a control unit and calculates a driving amount output of the focus lens based on the sampled lens position signal and target position signal; an up-sampling unit that performs up-sampling on the driving amount output obtained by the driving amount calculator at a second time period which is a period obtained by dividing the first time period by an integer; and a resonance suppression calculator that performs calculation on a result obtained by sampling the driving amount output at the second time period to suppress a higher-order resonant frequency component in a specified resonant frequency band.

20 Claims, 17 Drawing Sheets

(51) Int. Cl.
*H04N 5/217* (2011.01)
*H04N 5/225* (2006.01)
*G02B 7/36* (2006.01)
*G03B 3/10* (2006.01)
*G03B 17/14* (2006.01)

(52) U.S. Cl.
CPC ............ *H04N 5/23212* (2013.01); *G03B 3/10* (2013.01); *G03B 17/14* (2013.01); *H04N 5/232* (2013.01); *G03B 2205/0007* (2013.01)
USPC ......... 348/345; 348/231.4; 348/241; 348/357

(56) References Cited

U.S. PATENT DOCUMENTS

2011/0063472 A1* 3/2011 Kitahira et al. ............ 348/222.1
2011/0091194 A1 4/2011 Isaka
2011/0176032 A1* 7/2011 Kajimura .................. 348/231.4
2012/0262595 A1 10/2012 Kishida

FOREIGN PATENT DOCUMENTS

| JP | 2011-024248 | 2/2011 |
| JP | 2011-118021 | 6/2011 |
| WO | WO 2011/048752 | 4/2011 |

OTHER PUBLICATIONS

International Search Report to PCT/JP2012/054988.

\* cited by examiner

FIG.12
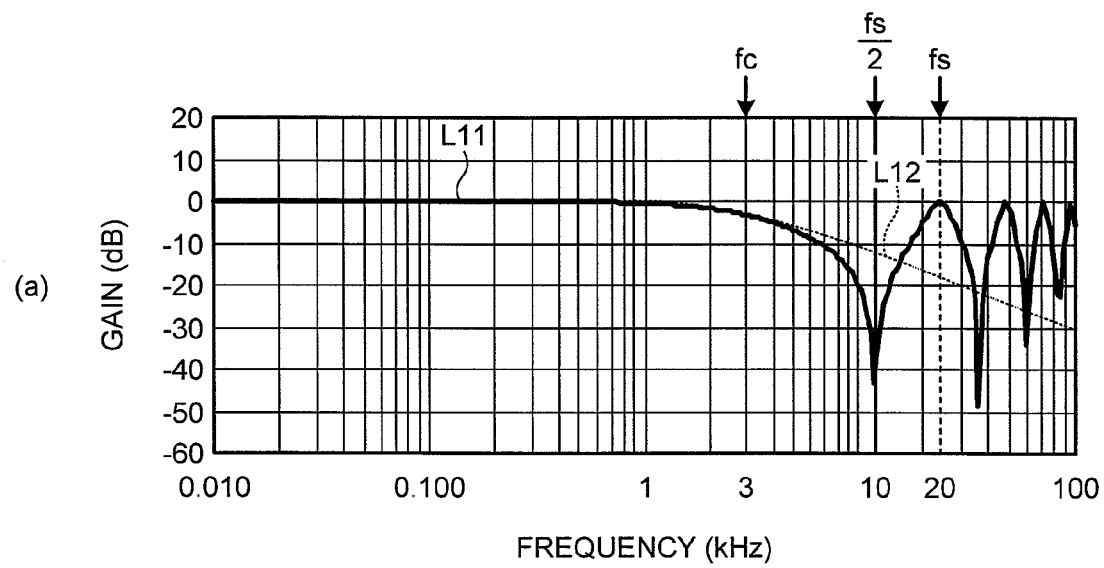
(a)
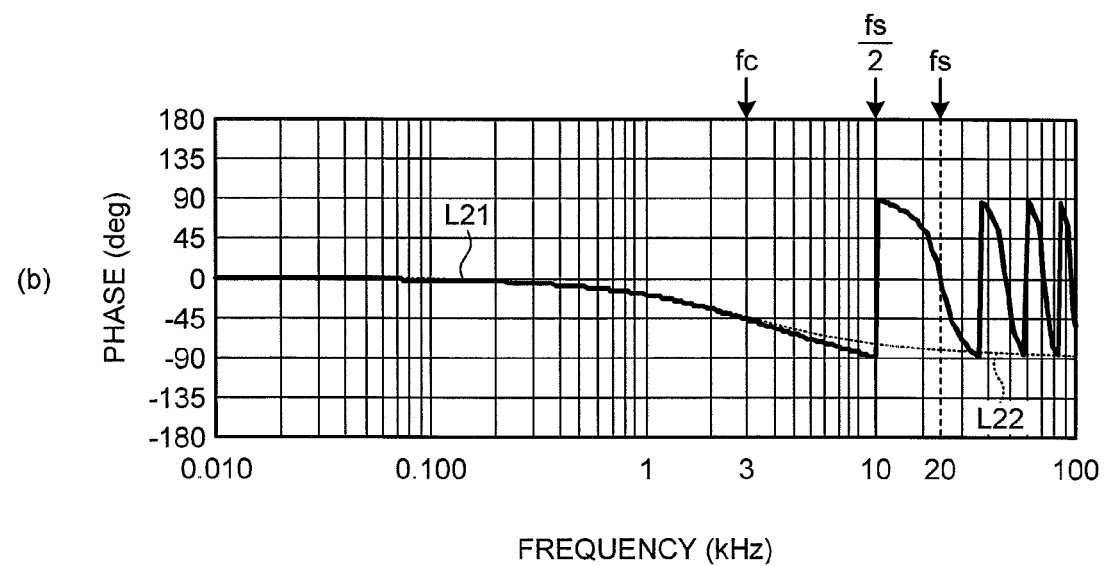
(b)

FIG.16
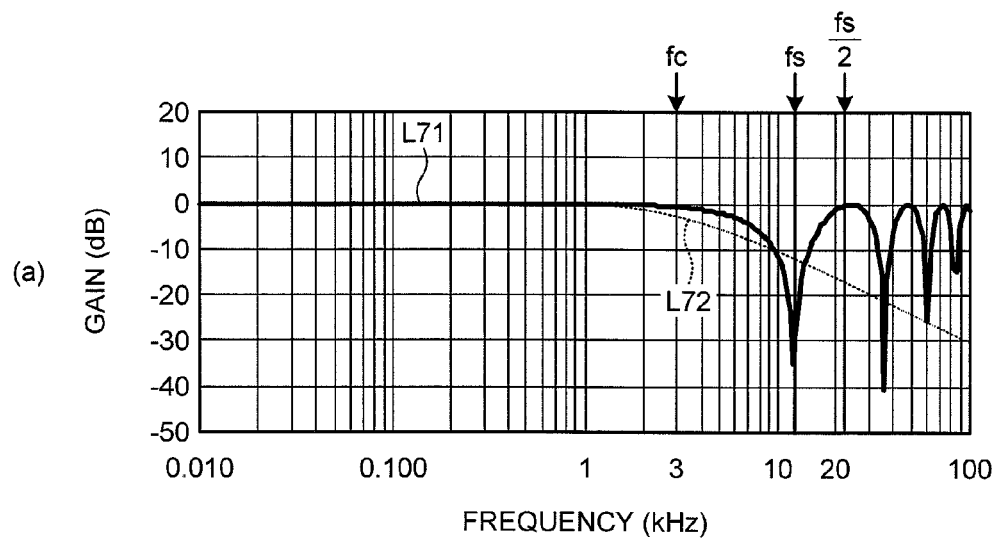
(a)
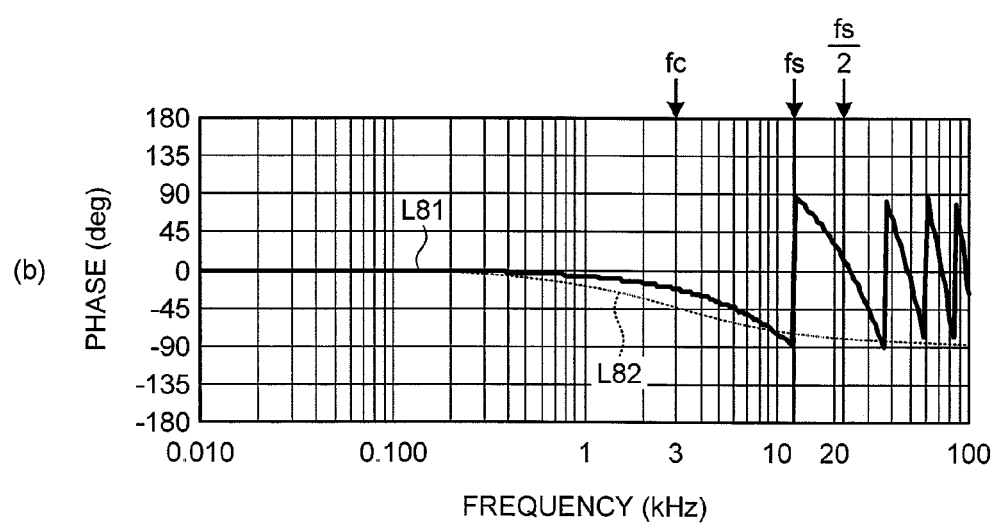
(b)

CAMERA DEVICE, INTERCHANGEABLE LENS DEVICE, CAMERA MAIN BODY, AND FOCUS CONTROL METHOD

FIELD

The present invention relates to a camera device that generates image data by imaging a specified viewing area and performing photoelectric conversion, an interchangeable lens camera device, an interchangeable lens device, a camera main body, and a focus control method.

BACKGROUND

In recent years, imaging devices such as a digital camera, which can perform not only static image capturing but also moving image capturing and sound recording at the same time, are in practical use. Regarding the moving image capturing, there is a device in which the maximum frame rate is 60 fps in accordance with reproduction of moving image in a High-Vision TV device. When capturing an image of a moving object, it is possible to suppress unnatural change of a captured moving image and capture a high quality image by increasing the frame rate of the moving image, for example, increasing the frame rate to 120 fps.

An interchangeable lens device including an auto-focus (hereinafter referred to as "AF") mechanism performs wobbling (hereinafter referred to as "Wob") driving of an AF operation in which a focus lens in the AF mechanism is reciprocated along the optical axis within the depth of focus in synchronization with the frame rate of the moving image and the focal position of the object is searched for and the focus lens is moved to a focus position on the basis of contrast evaluation value (hereinafter referred to as "AF evaluation value") obtained from spatial brightness variation of images acquired at each frame rate. Therefore, in the AF mechanism, when the focus lens is Wob-driven in accordance with the high frame rate of the moving image, inertial force during lens driving increases due to a shortened cycle of Wob driving, and vibration during driving and reaction vibration of a support member that supports the focus lens increase, so that driving sound generated during lens driving increases. As a result, there is a problem that the driving sound is collected by a sound-collecting microphone as noise when a moving image is captured.

Therefore, an AF mechanism is known in which a motor such as a voice coil motor (hereinafter referred to as "VCM") is employed as a drive unit that drives the focus lens in order to realize high-speed Wob driving and reduce vibration and noise during Wob driving (for example, see Patent Literature 1). According to this technique, in the Wob driving while a moving image is captured, a rapid acceleration change of the focus lens drive unit is suppressed by suppressing the maximum speed while the moving of the focus lens is controlled, so that the vibration and noise are suppressed.

CITATION LIST

Patent Literature

Patent Literature 1: Japanese Laid-open Patent Publication No. 2006-65176

SUMMARY

Technical Problem

However, in the technique described above, the focus lens drive unit has a resonant frequency that emphasizes vibration due to elastic characteristics of the focus lens and a drive member. Therefore, if the resonant frequency of the drive unit is included in frequency components included in supply current which is supplied to the drive unit from a lens controller in the interchangeable lens device, a drive amplitude increases, so that the driving sound increases during the AF operation.

Since the focus lens moving speed is suppressed while a moving image is captured, when increasing the frame rate, it is difficult to perform Wob driving control of the focus lens in synchronization with the frame rate, so that there is a problem that it is not possible to increase the frame rate and decrease the driving sound during the AF operation at the same time.

The present invention is made in view of the above situation and an object of the present invention is to provide a camera device, an interchangeable lens device, a camera main body, and a focus control method, which can reduce the noise generated by the AF operation at a high frame rate while a moving image is captured.

Solution to Problem

In order to solve the above problem and achieve the object, a camera device according to the invention includes an imaging element for generating image data by performing photoelectric conversion. The camera device includes: a focus lens that adjusts a focus position of an object whose image is formed on an imaging surface of the imaging element; a lens drive unit that drives the focus lens forward and backward along an optical axis direction of the camera device; a lens position detector that detects a lens position of the focus lens on the optical axis; a lens controller that controls the lens drive unit; and a control unit that controls an image capturing operation when the camera device captures an image. The lens controller includes: a driving amount calculator that samples, for each first time period, a lens position signal indicating the lens position detected by the lens position detector and a target position signal of the focus lens on the optical axis transmitted from the control unit and calculates a driving amount output of the focus lens based on the sampled lens position signal and target position signal; an up-sampling unit that performs up-sampling on the driving amount output obtained by the driving amount calculator at a second time period which is a period obtained by dividing the first time period by an integer; and a resonance suppression calculator that performs calculation on a result obtained by sampling the driving amount output at the second time period to suppress a higher-order resonant frequency component in a specified resonant frequency band.

According to the camera device of the invention, in the above invention, the resonance suppression calculator sets a cut-off frequency for cutting off the higher-order resonant frequency component to lower than or equal to ½ of a sampling frequency that is an inverse of the second time period and performs digital filter calculation processing having characteristics that cause frequencies lower than the cut-off frequency to pass through.

According to the camera device of the invention, in the above invention, the resonance suppression calculator obtains the driving amount output by performing the digital filter calculation processing to be a primary IIR filter form at primary low-pass filter characteristics, on a calculation value obtained when sampling is performed at the second time period.

According to the camera device of the invention, in the above invention, the resonance suppression calculator is an FIR filter type digital filter, and the resonance suppression calculator obtains the driving amount output of the focus lens by averaging a calculation value sampled at the second time period and a calculation sampled at the previous time period.

According to the camera device of the invention, in the above invention, the lens controller further includes a parameter change unit that changes a setting value of a cut-off frequency band for cutting off the resonant frequency band based on an instruction signal transmitted from the control unit.

According to the camera device of the invention, in the above invention, the driving amount calculator includes: a feedback calculator that calculates a control amount for adjusting the driving amount output by the lens drive unit based on a difference between the lens position signal and the target position signal; a feed forward calculator that calculates the driving amount by the lens drive unit based on the target position signal while the focus lens is moving; and an adder that outputs the driving amount output obtained by calculating a sum of the control amount calculated by the feedback calculator and the driving amount calculated by the feed forward calculator.

According to the camera device of the invention, in the above invention, the feed forward calculator stops calculation on the target position signal when the focus lens stands by at a certain position.

According to the camera device of the invention, in the above invention, the lens drive unit includes a linear motor.

According to the camera device of the invention, in the above invention, a resonant frequency band existing in the lens drive unit exists in an audible frequency range.

An interchangeable lens device according to the invention is detachably attached to an interchangeable lens type camera main body including an imaging element for generating image data by performing photoelectric conversion. The interchangeable lens device includes: a focus lens that adjusts a focus position of an object whose image is formed on an imaging surface of the imaging element; a lens drive unit that drives the focus lens forward and backward along an optical axis of the interchangeable lens device; a position detector that detects a lens position of the focus lens on the optical axis; and a lens controller that controls the lens drive unit. The lens controller includes: a driving amount calculator that samples, for each first time period, a lens position signal indicating the lens position detected by the position detector and a target position signal of the focus lens on the optical axis transmitted from the camera main body and calculates a driving amount output of the focus lens by the lens drive unit based on the sampled lens position signal and target position signal; an up-sampling unit that performs up-sampling on the driving amount output obtained by the driving amount calculator at a second time period which is a period obtained by dividing the first time period by an integer; and a resonance suppression calculator that performs calculation on a result obtained by sampling the driving amount output at the second time period to suppress a higher-order resonant frequency component in a specified resonant frequency band.

According to the interchangeable lens device of the invention, in the above invention, the resonance suppression calculator sets a cut-off frequency for cutting off the higher-order resonant frequency component to lower than or equal to ½ of a sampling frequency that is an inverse of the second time period and performs digital filter calculation processing having characteristics that cause frequencies lower than the cut-off frequency to pass through.

According to the interchangeable lens device of the invention, in the above invention, the resonance suppression calculator obtains the driving amount output by performing the digital filter calculation processing to be a primary IIR filter form at primary low-pass filter characteristics, on a calculation value obtained when sampling is performed at the second time period.

According to the interchangeable lens device of the invention, in the above invention, the resonance suppression calculator is an FIR filter type digital filter, and the resonance suppression calculator obtains the driving amount output of the focus lens by averaging a calculation value sampled at the second time period and a calculation sampled at the previous time period.

According to the interchangeable lens device of the invention, in the above invention, the lens controller includes a parameter change unit that changes a setting value of a cut-off frequency band for cutting off the resonant frequency band based on an instruction signal transmitted from the control unit.

According to the interchangeable lens device of the invention, in the above invention, the driving amount calculator includes: a feedback calculator that calculates a control amount for adjusting the driving amount output by the lens drive unit based on a difference between the lens position signal and the target position signal; a feed forward calculator that calculates the driving amount by the lens drive unit based on the target position signal while the focus lens is moving; and an adder that outputs the driving amount output obtained by calculating a sum of the control amount calculated by the feedback calculator and the driving amount calculated by the feed forward calculator.

According to the interchangeable lens device of the invention, in the above invention, the feed forward calculator stops calculation on the target position signal when the focus lens stands by at a certain position.

According to the interchangeable lens device of the invention, in the above invention, the lens drive unit includes a linear motor.

According to the interchangeable lens device of the invention, in the above invention, a resonant frequency band existing in the lens drive unit exists in an audible frequency range.

A camera main body according to the invention is a device to which an interchangeable lens device is detachably attached. The interchangeable lens device includes a focus lens that adjusts a focus position of an object whose image is formed on an imaging surface of an imaging element for generating image data by performing photoelectric conversion. The camera main body includes: a control unit that acquires an image signal by driving and controlling the imaging element and calculates a control amount with respect to the interchangeable lens device; an image capturing condition selection unit that selects either one of still image capturing and moving image capturing; and a main body communication unit that transmits a control signal outputted from the control unit to the interchangeable lens device based on a calculation result by the control unit and receives a control signal outputted from the interchangeable lens device. The control unit calculates a control amount including a target position to which the focus lens in the interchangeable lens is moved, an amount of reciprocal movement of the focus lens with the target position at a center of the reciprocal movement, and a period of the reciprocal movement, outputs the control amount to the main body communication unit, and acquires lens position information indicating a current lens position of the focus lens on an optical axis from the interchangeable lens device through the main body communication unit.

According to the camera main body of the invention, in the above invention, the control unit acquires the lens position information from the interchangeable lens device through the main body communication unit in synchronization with a frame rate of the image data generated by the imaging element when the camera main body captures a moving image, calculates the control amount, and outputs the control amount to the interchangeable lens device.

According to the camera main body of the invention, in the above invention, the control unit transmits a control signal to change a setting of a cut-off frequency band for cutting off a resonant frequency band of the interchangeable lens device, to the interchangeable lens device through the main body communication unit.

A focus control method according to the invention is performed by a camera system which includes a camera main body having an imaging unit for generating image data by performing photoelectric conversion and includes an interchangeable lens device which is detachably attached to the camera main body and has a focus lens that adjusts a focus position of an object whose image is formed on an imaging surface of the imaging element and a lens drive unit that moves the focus lens forward and backward along an optical axis. The focus control method includes: a position detection step of detecting a lens position of the focus lens on the optical axis; a driving amount calculation step of sampling, for each first time period, a lens position signal indicating the lens position detected by the position detection step and a target position signal of the focus lens on the optical axis transmitted from the camera main body and calculating a driving amount output indicating a driving amount of the focus lens by the lens drive unit based on the sampled lens position signal and target position signal; an up-sampling step of performing up-sampling on the driving amount signal calculated by the driving amount calculation step at a second time period which is a period obtained by dividing the first time period by an integer; and a resonance suppression calculation step of performing calculation on the driving amount output up-sampled by the up-sampling step to suppress a higher-order resonant frequency component in a specified resonant frequency band.

Advantageous Effects of Invention

According to the present invention, the driving amount calculator samples the target position signal and the lens position signal for each first period and calculates the driving amount signal indicating the driving amount of the focus lens by the lens drive unit based on the sampled target position signal and lens position signal. The up-sampling unit performs up-sampling on the calculation result at the second time period which is a period obtained by dividing the first time period by an integer, and the resonance suppression calculator performs calculation on the driving amount signal up-sampled by the up-sampling unit for suppressing the higher-order resonant frequency component of the focus lens drive unit by attenuating an output of a specified suppression frequency band for each up-sampled second period. As a result, it is possible to reduce the noise excited by the higher-order resonant frequency generated by the AF operation, that is, the Wob driving, at a high-speed frame rate while a moving image is being captured.

BRIEF DESCRIPTION OF DRAWINGS

FIG. 12 is a Bode diagram of transmission characteristics of a second calculation result.

FIG. 16 is a Bode diagram of transmission characteristics to which a calculation result of a second calculation process according to the second embodiment of the present invention is added.

DESCRIPTION OF EMBODIMENTS

Figure 1:
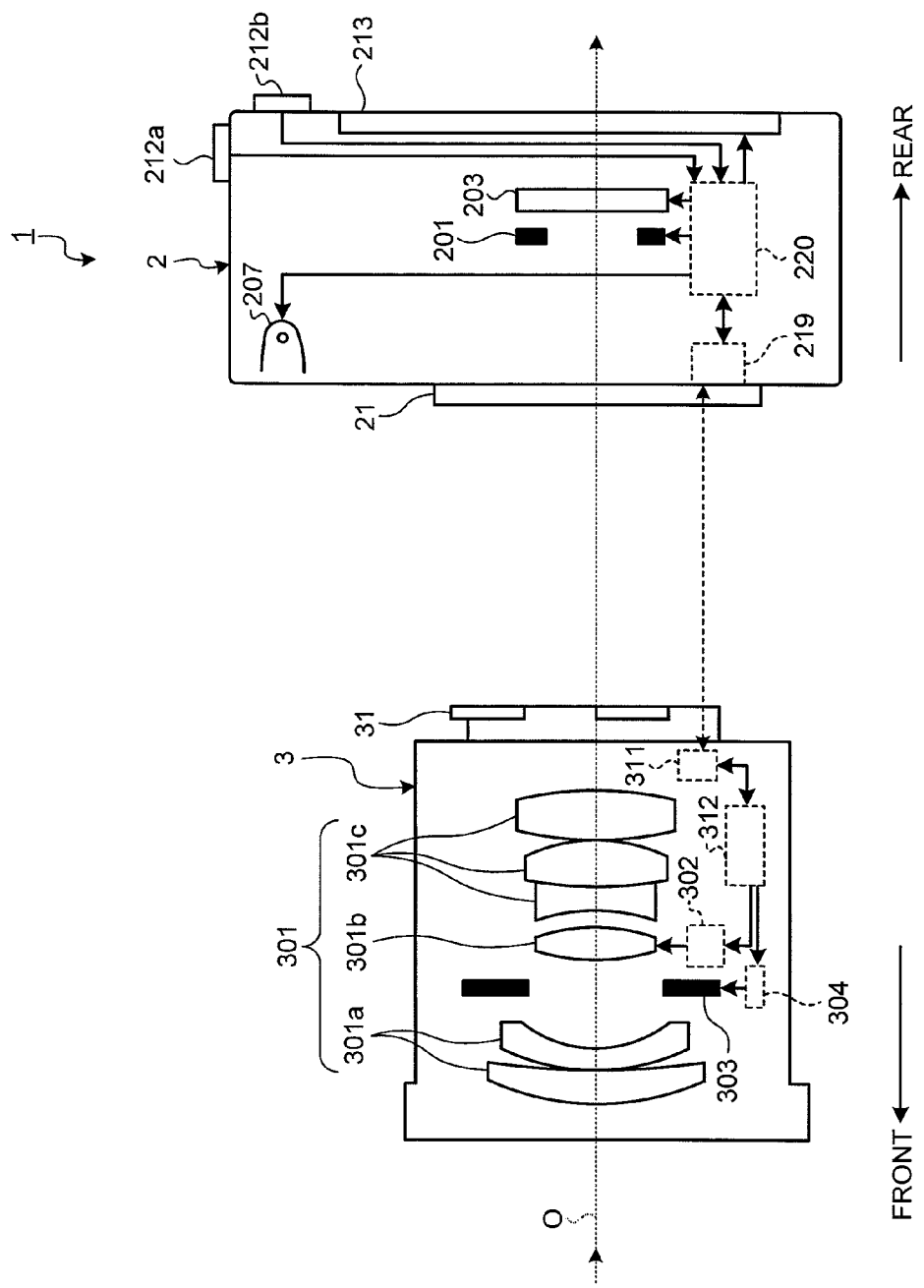
FIG. 1 is a schematic configuration diagram of a camera system in which an interchangeable lens device according to a first embodiment of the present invention is mounted.

Hereinafter, modes for carrying out the present invention (hereinafter referred to as "embodiments") will be described with reference to the drawings. The present invention is not limited by the embodiments. In the description of the drawings, the same components are given the same reference numerals.

First Embodiment

Figure 2:
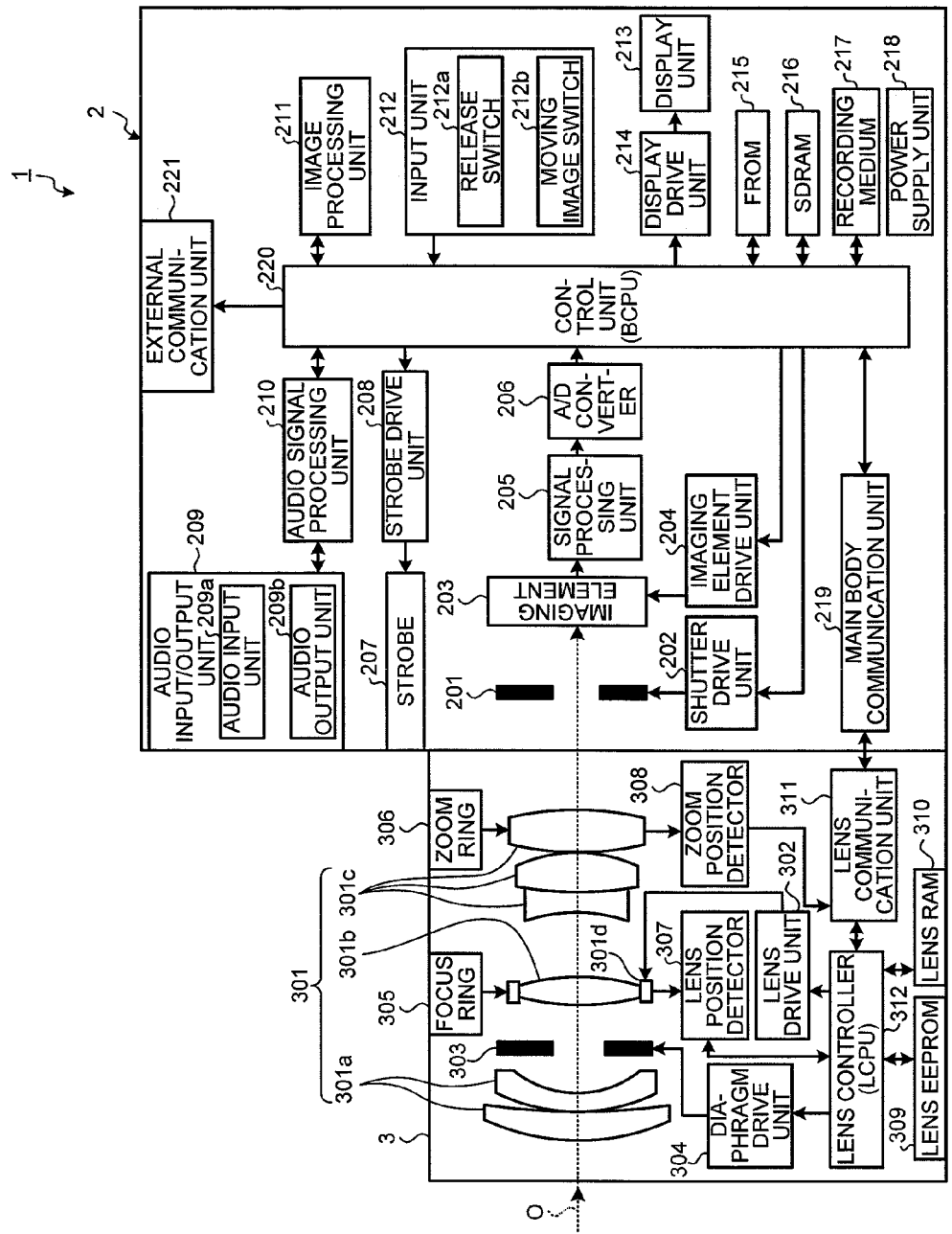
FIG. 2 is a block diagram illustrating a configuration of the camera system in which the interchangeable lens device according to the first embodiment of the present invention is mounted.

FIG. 1 is a schematic configuration diagram of a camera system in which an interchangeable lens device according to a first embodiment of the present invention is mounted. FIG. 2 is a block diagram illustrating a configuration of the camera system in which the interchangeable lens device according to the first embodiment of the present invention is mounted. In the description of FIG. 1 and FIG. 2, the left side is defined as the front side and the right side is defined as the rear side.

A camera system 1 illustrated in FIG. 1 and FIG. 2 includes a main body unit 2 and an interchangeable lens device 3 attachable to the main body unit 2. The interchangeable lens device 3 is attached to the main body unit 2 by connecting a rear side lens mount 31 provided at the rear of the interchangeable lens device 3 to a main body side mount ring 21 provided at the front of the main body unit 2. Thereby, the main body unit 2 and the interchangeable lens device 3 are integrally connected. The aforementioned main body side mount ring 21 may be, for example, bayonet type.

The main body unit 2 includes a shutter 201, a shutter drive unit 202, an imaging element 203, an imaging element drive unit 204, a signal processing unit 205, an A/D converter 206, a strobe 207, a strobe drive unit 208, an audio input/output unit 209, an audio signal processing unit 210, an image processing unit 211, an input unit 212, a display unit 213, a display drive unit 214, an FROM 215, an SDRAM 216, a recording medium 217, a power supply unit 218, a main body communication unit 219, and control unit 220 (hereinafter referred to as "BCPU 220").

The shutter 201 performs an exposure operation for setting a state of the imaging element 203 to an exposed state or a light-shielded state by performing an opening/closing operation. The shutter drive unit 202 includes a stepping motor and the like and drives the shutter 201 according to an instruction signal inputted from the control unit 220.

The imaging element 203 is formed by using a CCD (Charge Coupled Device) or a CMOS (Complementary Metal Oxide Semiconductor). The imaging element 203 generates two-dimensional image data by receiving light collected by the interchangeable lens device 3, performing photoelectric conversion on each pixel, and sequentially transmitting electrical signals. The imaging element drive unit 204 performs an exposure of the imaging element 203 and a transmission operation of the electrical signals at a specified imaging timing. When transmitting the electrical signals, the imaging element drive unit 204 causes the signal processing unit 205 to sequentially output image data of an analog signal of charge amount output or voltage output which is photoelectrically converted in each pixel of the imaging element 203.

The signal processing unit 205 performs analog signal processing on the image data of each pixel transmitted from the imaging element 203 and outputs the image data to the A/D converter 206. Specifically, the signal processing unit 205 performs noise reduction processing such as filtering and bias offset cancellation and amplification processing of pixel output on the image data.

The A/D converter 206 sequentially performs A/D conversion on the image data of each pixel processed by the signal processing unit 205 and thereby generates two-dimensional digitalized image data (RAW data), which is detected by the imaging element 203 and which includes horizontal direction data and vertical direction data, and outputs the image data to the control unit 220.

The strobe 207 formed by a xenon lamp, an LED, or the like. The strobe 207 emits light on a specified visual field area in synchronization with the exposure operation of the shutter 201. The strobe drive unit 208 causes the strobe 207 to emit light under control of the control unit 220.

The audio input/output unit 209 includes an audio input unit 209a and an audio output unit 209b. The audio input unit 209a is formed by using a microphone or the like. The audio output unit 209b is formed by using a speaker or the like. The audio input unit 209a acquires audio information. The audio output unit 209b reproduces and outputs the acquired audio information. The audio signal processing unit 210 performs specified signal processing on audio data (analog signal) inputted from the audio input unit 209a, generates digital audio data by performing A/D conversion, outputs the generated audio data to the control unit (BCPU) 220, and performs an operation to record the audio. When reproducing the audio, the audio signal processing unit 210 generates analog audio data by performing D/A conversion on audio data inputted from the BCPU 220 and outputs the generated audio data to the audio output unit 209b included in the audio input/output unit 209 to reproduce and output the recorded audio data.

The image processing unit 211 performs various image processing on the image data. Specifically, the image processing unit 211 performs image processing including optical black subtraction processing for correcting output offset due to dark current output of the imaging element, white balance adjustment processing for adjusting RGB output mixing ratio and correcting color temperature of an object, image data synchronization processing, color matrix calculation processing for converting three primary color output of RGB information to brightness—color difference—color phase components, γ correction processing, color reproduction processing, edge enhancement processing, and the like on the image data.

The image processing unit 211 extracts a high frequency component (contrast) in a spatial frequency from image data in a focal point detection area by spatial high-pass filter calculation processing and performs calculation processing for calculating an AF evaluation value from a specified spatial frequency spectrum. The image processing unit 211 compresses the image data by a specified method. For example, when the image data is a still image, the image processing unit 211 compresses the image data by JPEG (Joint Photographic Experts Group) method. When the image data is a continuously captured moving image data, the image processing unit 211 compresses the moving image data according to Motion JPEG method or MP4 (H.264) with a higher data compression ratio and records the compressed image data in the recording medium 217.

The input unit 212 includes a power supply switch (not illustrated in the drawings) that switches a power supply state of the camera system 1 to an ON state or an OFF state, a release switch 212a that accepts an input of a still image release signal that gives an instruction of capturing a still image, an image capturing mode switching switch (not illustrated in the drawings) that switches various types of image capturing modes set in the camera system 1, and a moving image switch 212b that accepts an input of a moving image release signal that gives an instruction of capturing a moving image. The release switch 212a can be moved forward and backward by pressure from outside and accepts an input of a first release signal that instructs an image capturing preparation operation when being half depressed as well as accepts a second release signal that gives an instruction for capturing a still image when being fully depressed.

The display unit 213 is formed by using a display panel such as a liquid crystal panel or an organic EL (Electro Luminescence) panel. The display drive unit 214 causes the display unit 213 to display captured image data. The display drive unit 214 causes the display unit 213 to display various image capturing information such as shutter speed, diaphragm value, sensitivity, and the date and time of capturing the image.

The FROM 215 is formed by using a non-volatile memory. The FROM 215 stores various programs to operate the camera system 1, various data used while the programs are executed, and various parameters necessary for operations of the image processing of the image processing unit 211.

The SDRAM 216 is formed by using a volatile memory. The SDRAM 216 temporarily stores information that is being processed by the control unit 220. For example, when still images are continuously captured or a moving image is captured, the SDRAM 216 temporarily stores digitalized image data, so that the signal processing in the image processing unit 211 and data transmission to the recording medium 217 are smoothly performed.

The recording medium 217 is formed by using a memory card or the like attached from outside of the main body unit 2. The recording medium 217 is detachably attached to the main body unit 2 through a memory I/F (not illustrated in the drawings). Image data is recorded in the recording medium 217 and recorded image data is read from the recording medium 217.

The power supply unit 218 is connected to the BCPU 220 included in the main body unit 2 and each component that performs electronic control and drive, and the power supply unit 218 supplies power to each component. The power supply unit 218 supplies power to each component included in the interchangeable lens device 3 through the main body communication unit 219. The power supply unit 218 performs specified smoothing and raising of direct current voltage on a voltage output of a battery (not illustrated in the drawings) mounted in the main body unit 2 and supplies power to each component in the main body unit 2.

The main body communication unit 219 is a communication interface for performing command communication and power supply to the interchangeable lens device 3 attached to the main body unit 2.

The BCPU 220 is formed by using a CPU (Central Processing Unit) or the like. The BCPU 220 integrally controls the operation of the camera system by transmitting instructions and data to each component included in the camera system 1 according to an instruction signal from the input unit 212. The BCPU 220 transmits a drive signal to drive the interchangeable lens device 3 and a request signal that requests a lens state of the interchangeable lens device 3 through the main body communication unit 219. When the frame rate of the image data generated by the imaging element 203, for example, the frame rate as a moving image capturing condition, is set to 120 fps, the BCPU 220 transmits the drive signal to drive the interchangeable lens device 3 at a cycle of $\frac{1}{120}$ second in synchronization with the frame rate.

An external communication unit 221 functions as an interface for connecting an electronic view finder (EVF) attached to the main body unit 2 and a communication unit or the like that bi-directionally communicates with an external processing device (not illustrated in the drawings) such as a personal computer through the Internet to the main body unit 2.

Next, the configuration of the interchangeable lens device 3 will be described. The interchangeable lens device 3 includes an optical system 301, a lens drive unit 302, a diaphragm mechanism 303, a diaphragm drive unit 304, a focus ring 305, a zoom ring 306, a lens position detector 307, a zoom position detector 308, a lens EEPROM 309, a lens RAM 310, a lens communication unit 311, and a lens controller 312.

The optical system 301 includes three lens groups which form an image on an imaging surface on the imaging element 203. Specifically, the optical system 301 is formed by using a front lens group 301a which is a first lens group, a focus lens 301b which is a second lens group, and a rear lens group 301c which is a third lens group in an order from front to rear.

The front lens group 301a is formed by using, for example, two lenses and has negative refractive power. The focus lens 301b is formed by using one or a plurality of lenses and has positive refractive power. The focus lens 301b is supported by a lens frame 301d and driven along an optical axis O direction during focusing (during AF). The rear lens group 301c is formed by using, for example, three lenses and has positive refractive power. The front lens group 301a, the focus lens 301b, and the rear lens group 301c are driven along the optical axis O direction during zooming.

The lens drive unit 302 moves the focus lens 301b toward a focusing position in the optical axis O direction by driving the lens frame 301d along the optical axis O direction during focusing. When the lens drive unit 302 performs a focusing operation when capturing a moving image, the lens drive unit 302 reciprocates the focus lens 301b along the optical axis O direction and performs Wob driving. Here, the Wob driving is a small reciprocating driving of the focus lens 301b of the interchangeable lens device 3, which is performed around a focus position of the camera system 1 at a cycle synchronized with the frame rate for capturing a moving image, when the camera system 1 captures a moving image. The lens drive unit 302 is formed by using a voice coil motor (hereinafter referred to as "VCM") or a linear motor and a lens drive driver or the like.

The diaphragm mechanism 303 adjusts exposure by changing a light transmission area by an open/close operation of a plurality of diaphragm blades (not illustrated in the drawings) and limiting the amount of incident light collected by the optical system 301. The diaphragm drive unit 304 is formed by using a stepping motor, a motor driver, and the like and drives the diaphragm mechanism 303.

When the camera system 1 is set to a manual focus mode (hereinafter referred to as "MF mode"), if the focus ring 305 is operated by a person who captures an image, the focus ring 305 adjusts the focal position of the interchangeable lens device 3 by moving the position of the focus lens 301b along the optical axis O direction. The focus ring 305 is a rotatable ring provided around a lens barrel of the interchangeable lens device 3.

If the zoom ring 306 is operated by a person who captures an image, the zoom ring 306 changes the angle of view (focal length) of the interchangeable lens device 3 by moving the position of the rear lens group 301c along the optical axis O direction. The zoom ring 306 is a rotatable ring provided around the lens barrel of the interchangeable lens device 3.

The lens position detector 307 detects the position of the focus lens 301b driven by the lens drive unit 302. The lens position detector 307 is formed by using a photo interrupter or the like.

The zoom position detector 308 detects the position of the rear lens group 301c driven by the zoom ring 306. The zoom position detector 308 is formed by a linear encoder sensor, a potentiometer such as a variable resistive element, or the like. The zoom position detector 308 converts an analog output voltage obtained by the linear encoder sensor or the potentiometer into digital by an A/D conversion circuit and detects the zoom position based on the converted digital signal.

The lens EEPROM 309 stores a control program for determining the position and motion of the optical system 301 and lens data including lens characteristics and various parameters of the optical system 301. The lens EEPROM 309 is formed by using a non-volatile memory.

The lens RAM 310 temporarily stores information that is being processed by the lens controller 312. The lens RAM 310 is formed by using a volatile memory.

The lens communication unit 311 is a communication interface for communicating with the main body communication unit 219 of the main body unit 2 when the interchangeable lens device 3 is attached to the main body unit 2. Power is supplied to each component included in the interchangeable lens device 3 from the power supply unit 218 of the main body unit 2 through the lens communication unit 311 and the main body communication unit 219.

The lens controller 312 is formed by using a CPU or the like. The lens controller 312 (hereinafter referred to as "LCPU 312") controls the operation of the interchangeable lens device 3. Specifically, the LCPU 312 performs focusing of the interchangeable lens device 3 by driving the lens drive unit 302 and changes the diaphragm value by driving the diaphragm drive unit 304. When the interchangeable lens device 3 is attached to the main body unit 2, the LCPU 312 is electrically connected to the BCPU 220 and controlled according to a drive signal and an instruction signal from the BCPU 220. Here, the drive signal includes a target position to which the focus lens 301b is moved along the optical axis O, the amount of reciprocal movement of the focus lens 301b, whose center is the target position, and a period of the reciprocal movement.

Figure 3:
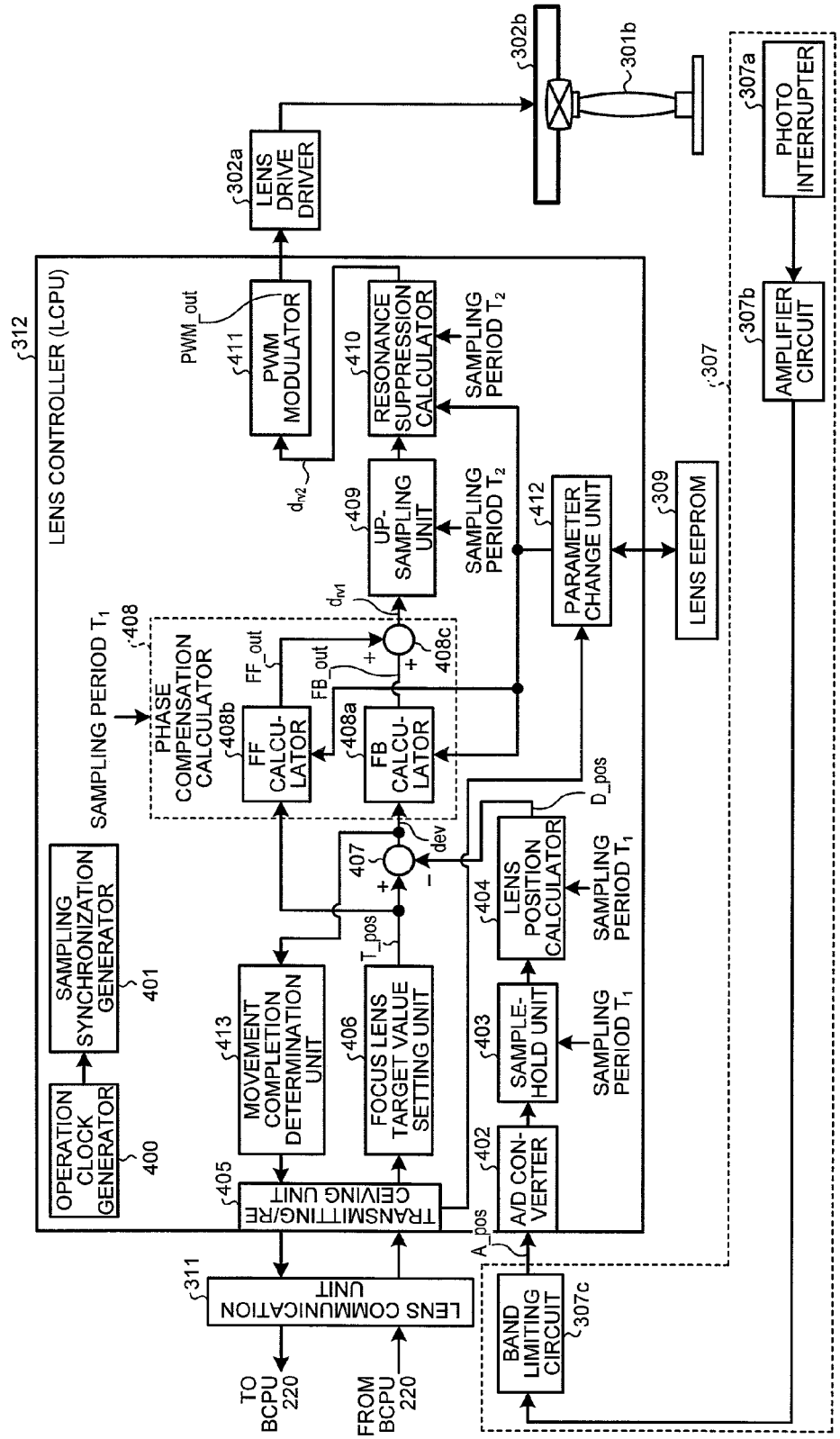
FIG. 3 is a block diagram illustrating a detailed configuration of a lens position detector and a lens controller illustrated in FIG. 2.

Here, detailed configurations of the lens position detector 307 and the LCPU 312 will be described. FIG. 3 is a block diagram illustrating the detailed configurations of the lens position detector 307 and the LCPU 312.

As illustrated in FIG. 3, the lens position detector 307 includes a photo interrupter 307a, an amplifier circuit 307b, and a band limiting circuit 307c.

The photo interrupter 307a includes a reflecting member (not illustrated in the drawings) and a photo reflector (not illustrated in the drawings). The reflecting member and the photo reflector are provided in the lens frame 301d and the lens barrel of the interchangeable lens device 3 respectively in a state in which the reflecting member and the photo reflector face each other. Light from the photo reflector is reflected by the reflecting member and enters the photo reflector again. Thereby, the photo interrupter 307a detects the position of the lens frame 301d by photoelectrically converting the amount of received light that changes according to the lens position into a voltage output and outputs a position signal (analog signal) according to the detection result to the amplifier circuit 307b.

The amplifier circuit 307b amplifies the position signal inputted from the photo interrupter 307a and outputs the position signal to the band limiting circuit 307c. In the present embodiment, the lens position detector 307 is a combination of the photo interrupter 307a and a photo reflector. However, a magnetic scale which is magnetized at regular intervals may be used instead of the photo reflector. Further, in the present embodiment, a magnetic sensor such as a Hall sensor and an MR sensor (magnetoresistive element) may be used instead of the photo interrupter.

The band limiting circuit 307c is connected to an A/D converter 402 of the LCPU 312. The band limiting circuit 307c extracts a specific frequency component by applying a specified band limitation to the position signal inputted from the amplifier circuit 307b and outputs the position signal of the extracted frequency component as an A_POS signal. Here, regarding the frequency band limitation, the frequency band is limited to lower than or equal to a frequency which is ½ of an inverse of a first period $T_1$ by which the LCPU 312 described later performs A/D conversion and samples and holds a signal.

The LCPU 312 includes an operation clock generator 400, a sampling synchronization generator 401, an A/D converter 402, a sample-hold unit 403, a lens position calculator 404, a transmitting/receiving unit 405, a focus lens target value setting unit 406, a subtracter 407, a phase compensation calculator 408, an up-sampling unit 409, a resonance suppression calculator 410, and a PWM modulator 411.

The operation clock generator 400 generates a reference clock which is referred to when each unit of the LCPU 312 performs calculation. The operation clock generator 400 may generate the reference clock in synchronization with a clock of the BCPU 220. The first period $T_1$ and the second period $T_2$ which are referred to when the focus lens 301b is controlled in the LCPU 312 are generated by dividing a clock frequency of the operation clock generator 400. The first period $T_1$ and the second period $T_2$ will be described later.

The sampling synchronization generator 401 generates the first period $T_1$ and the second period $T_2$ which are referred to when each unit of the LCPU 312 performs calculation when the focus lens 301b is controlled in the LCPU 312.

The A/D converter 402 performs A/D conversion on the position signal (A_POS) inputted from the band limiting circuit 307c and outputs the position signal to the sample-hold unit 403.

The sample-hold unit 403 shapes a waveform of the position signal inputted from the A/D converter 402 and outputs the position signal to the lens position calculator 404. Specifically, the sample-hold unit 403 samples the position signal inputted from the A/D converter 402 at a specified timing (sampling period $T_1$), causes the lens position calculator 404 to perform calculation processing on the sampled position signal, and holds the calculation result until the time of the next sampling period.

The lens position calculator 404 calculates the lens position of the focus lens 301b on the optical axis O on the basis of the position signal inputted from the sample-hold unit 403 and outputs a D_POS signal obtained as the calculation result to the subtracter 407.

The transmitting/receiving unit 405 transmits an instruction signal transmitted from the BCPU 220 through the lens communication unit 311 to the focus lens target value setting unit 406. Further, the transmitting/receiving unit 405 outputs a signal indicating a determination result of a movement completion determination unit 413 to the BCPU 220 through the lens communication unit 311.

The focus lens target value setting unit 406 sets a target position signal indicating a target position to the position to which the focus lens 301b is driven on the basis of a drive signal from the BCPU 220 and outputs the set target position signal (T_Pos) to the subtracter 407.

The subtracter 407 calculates a difference (deviation amount from the target value) between the target position signal (T_Pos) inputted from the focus lens target value setting unit 406 and a lens position signal (D_Pos) inputted from the lens position calculator 404 and outputs a signal (dev) obtained by the calculation to the phase compensation calculator 408.

The phase compensation calculator 408 performs calculation processing based on the target position signal (T_Pos) inputted from the focus lens target value setting unit 406 and the signal (dev) obtained from the subtracter 407 and outputs a signal (drv1) obtained by the calculation processing to the up-sampling unit 409 for each first time period $T_1$. Specifically, the phase compensation calculator 408 calculates a driving amount (drv1) of the focus lens 301b driven by the lens drive unit 302 on the basis of the target position signal (T_Pos) inputted from the focus lens target value setting unit 406 and the output signal (dev) of the subtracter 407 for each first time period ($T_1$) in order to control the lens drive unit 302 to follow up the target position and outputs a signal obtained by this calculation to the up-sampling unit 409. The phase compensation calculator 408 is formed by an FB (Feedback) calculator 408a, an FF (Feed forward) calculator 408b, and an adder 408c.

The FB calculator 408a calculates a follow-up control amount of feedback control, which is a driving amount of the focus lens 301b by the lens drive unit 302 on the basis of the output signal (dev) of the subtracter 407 and outputs a signal (FB out) obtained by this calculation to the adder 408c. Specifically, the FB calculator 408a performs a phase lead compensation filter calculation and a phase lag compensation filter calculation on the signal (dev) outputted from the subtracter 407 and performs closed loop gain increase of the feedback control system at a driving frequency during Wob driving in order to secure a control stability (phase margin) in the lens position feedback control by the phase lead compensation filter calculation and obtain a follow-up performance of the driving frequency during Wob driving by the phase lag compensation.

The FF calculator 408b calculates a driving amount of the focus lens 301b driven by the lens drive unit 302 on the basis of the target position signal (T_pos) inputted from the focus lens target value setting unit 406 when the focus lens 301b is moving and outputs a signal (FF_out) obtained by this calculation to the adder 408c. Specifically, for each first time period ($T_1$), the FF calculator 408b calculates characteristics inverse to transmission characteristics of the focus lens drive unit on the basis of the target position signal (FF_out) inputted from the focus lens target value setting unit 406 and thereafter calculates the driving amount of the focus lens 301b driven by the lens drive unit 302 and outputs the signal (FF_out) obtained by this calculation to the adder 408c. Further, the FF calculator 408b stops the calculation on the target position signal inputted from the focus lens target value setting unit 406 when the focus lens 301b is held on the optical axis O and moving on the optical axis O.

The adder 408c adds the output signal (FB out) of the FF calculator 408a and the output signal (FF_out) of the FF calculator 408b and outputs the addition result (drv1) to the up-sampling unit 409.

The up-sampling unit 409 performs up-sampling of the signal (drv1) inputted from the phase compensation calculator 408 at a second time period ($T_2$) which is ½ of the first time period ($T_1$) to generate an input signal to the resonance suppression calculator 410. In other words, the up-sampling unit 409 performs sampling processing on the signal inputted from the phase compensation calculator 408 at a sampling frequency two times the sampling frequency and outputs the sampled signal to the resonance suppression calculator 410.

The resonance suppression calculator 410 is formed by a digital filter calculation to be a low pass filter form. The resonance suppression calculator 410 performs calculation on the signal up-sampled by the up-sampling unit 409 to suppress a higher-order resonant frequency component of the resonant frequency band unique to the interchangeable lens device 3 and outputs the calculation result to the PWM modulator 411. Specifically, the resonance suppression calculator 410 applies low-pass filter calculation processing for cutting off frequency bands higher than or equal to a specified frequency, to the signal inputted from the up-sampling unit 409 and outputs the processed signal to the PWM modulator 411. Here, the frequency bands higher than or equal to the specified frequency are an audible frequency range in the higher-order resonant frequency band included in the signal. Further, the resonance suppression calculator 410 performs digital filter calculation processing having low-pass characteristics in which the cut-off frequency ($f_c$) for cutting off the higher-order resonant frequency is lower than or equal to ½ (f/2 =½$T_2$) of the sampling frequency which is the inverse of the second time period ($T_2$).

Figure 4:
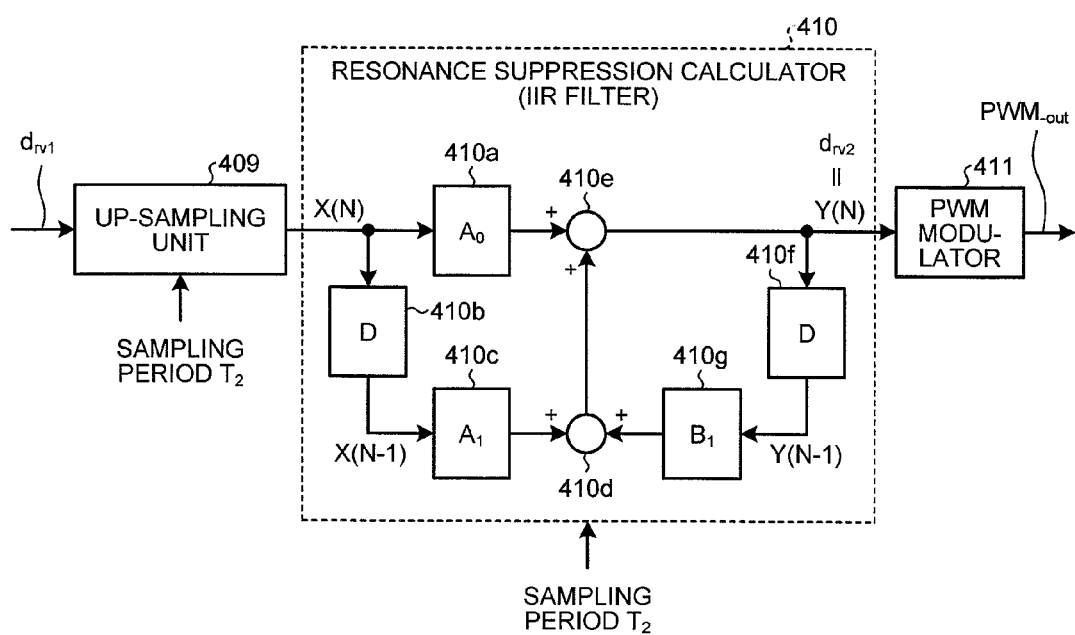
FIG. 4 is a block diagram illustrating a configuration of a resonance suppression calculator illustrated in FIG. 3.

FIG. 4 is a block diagram illustrating a configuration of the digital filter calculation of the resonance suppression calculator 410. As illustrated in FIG. 4, the resonance suppression calculator 410 is formed by a primary IIR (Infinite Impulse Response) filter having a three-term product-sum calculation configuration which obtains a calculation output Y(N) by calculating the sum of a latest signal (X(N)) which is obtained by up-sampling the calculation output signal (drv1) of the phase compensation calculator 408 at the second time period $T_2$, a previously sampled signal (X(N−1)), and a calculation result Y(N−1) of previous sampling in the resonance suppression calculator 410, which are weighted (multiplied) by specified coefficients $A_0$, $A_1$, and $B_1$ respectively. The resonance suppression calculator 410 includes a multiplier 410a, an input delay unit 410b, a multiplier 410c, an adder 410d, an adder 410e, an output delay unit 410f, and a multiplier 410g.

The multiplier 410a multiplies the input signal X(N) from the up-sampling unit 409 by a specified number ($A_0$) and outputs the multiplied signal. The input delay unit 410b outputs input data sampled in the previous sampling period at the output timing of the input signal X(N) from the up-sampling unit 409. The multiplier 410c multiplies the output signal X(N−1) from the input delay unit 410b by a specified number ($A_1$) and outputs the multiplied signal. The adder 410d calculates the sum of the output signal of the multiplier 410c and the output signal of the multiplier 410g and outputs the sum. The adder 410e calculates the sum of the output signal of the multiplier 410a and the output signal of the adder 410d and outputs the sum. The output delay unit 410f outputs a value Y(N−1) which is the previously sampled value of the output signal Y(N) of the adder 410e. The multiplier 410g multiplies the output signal Y(N−1) of the output delay unit 410f by a specified number ($B_1$) and outputs the multiplied signal.

When the input signal from the up-sampling unit 409 is X(N), the output signal of the multiplier 410a is represented by $A_0$X(N), the output signal of the input delay unit 410b is represented by X(N−1), and the output signal of the multiplier 410c is represented by $A_1$X(N−1). When the output signal of the adder 410e is Y(N), the output signal of the output delay unit 410f is represented by Y(N−1) and the output signal of the multiplier 410g is represented by $B_1$Y(N−1). Therefore, the output signal Y(N) of the resonance suppression calculator 410 is represented by the following recurrence formula (1):

$$Y(N)=A_0 \cdot X(N)+A_1 \cdot X(N-1)+B_1 \cdot Y(N-1) \tag{1}$$

The coefficients $A_0$, $A_1$, and $B_1$ of the formula (1) are defined by, for example, the following formulas (2) and (3):

$$A_0=A_1=1/(1+f_{s2}/f_c)/\pi \tag{2}$$

$$B_1=(f_{s2}-\pi \cdot f_c)/(f_{s2}+\pi \cdot f_c) \tag{3}$$

Here, $f_c$ is the cut-off frequency of the resonance suppression calculator 410 and $f_{s2}$ is an up-sampling frequency of the up-sampling unit 409. When N=0, Y(0)=X(0)=0 is established.

When the transfer function by the Laplace transform in a continuous time system as the transmission characteristics of the resonance suppression calculator 410 as a primary low-pass filter is G2(s), the formula (4) below is established.

$$G2(s)=2\pi f_c/(s+2\pi f_c) \tag{4}$$

Here, $\pi$ is a ratio of the circumference of a circle to its diameter.

Therefore, from the transfer function of the formula (4), the digital filter characteristics at the sampling frequency $f_{s2}$ are represented as a transfer function (z function) of the discretized Laplace transform by the bilinear transform formula (5).

$$S=2 \cdot f_{s2} \cdot (1-z^{-1})/(1+z^{-1}) \tag{5}$$

The transmission characteristics of one sampling delay of $z^{-1}$ in the formula (5) is defined by the following formula (6).

$$z^{-1}=\exp(-s/f_{s2}) \qquad (6)$$

The PWM modulator 411 outputs a pulse signal converted into a switching pulse time width by PWM modulation to a lens drive driver 302a according to a signal inputted from the resonance suppression calculator 410.

A parameter change unit 412 changes the second time period in the up-sampling unit 409 and a setting value of the cut-off frequency band by which the resonant frequency band of the interchangeable lens device 3 is cut off by referring to various parameters stored in the lens EEPROM 309 on the basis of an instruction signal transmitted from the BCPU 220 through the lens communication unit 311 and the transmitting/receiving unit 405.

The movement completion determination unit 413 outputs a signal indicating that the movement of the focus lens 301b is completed to the transmitting/receiving unit 405. This signal is outputted to the BCPU 220 through the lens communication unit 311.

Figure 5:
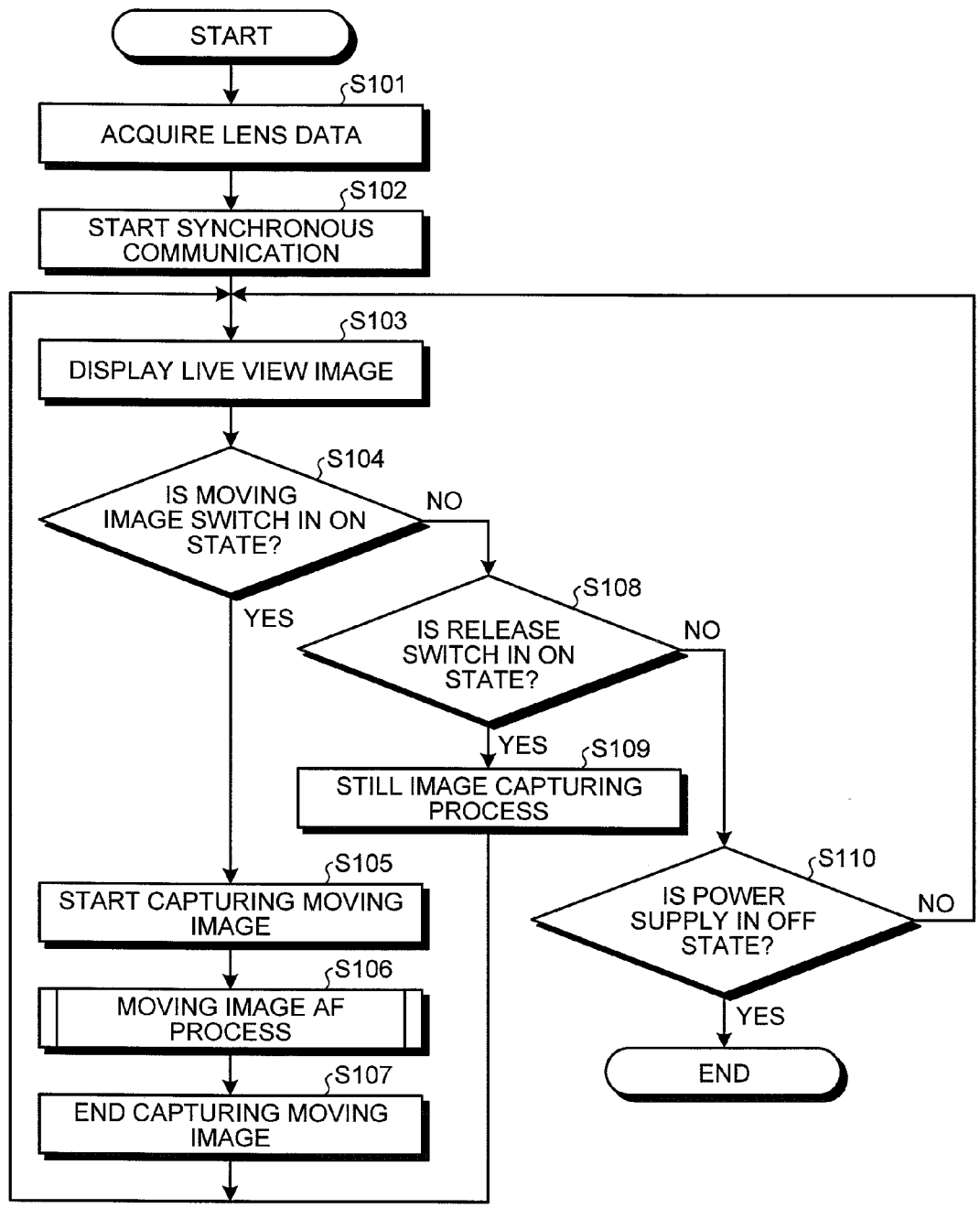
FIG. 5 is a flowchart illustrating an overview of a process performed by the camera system according to the first embodiment of the present invention.

Next, the operation performed by the camera system 1 according to the first embodiment will be described. FIG. 5 is a flowchart illustrating an overview of a process performed by the camera system 1 according to the first embodiment.

As illustrated in FIG. 5, the BCPU 220 acquires lens data from the interchangeable lens device 3 through the main body communication unit 219 (step S101). Specifically, the BCPU 220 transmits a lens data request signal to the LCPU 312 and acquires the lens data transmitted from the LCPU 312. The lens data includes operation parameters and optical data of the focus lens 301b. The operation parameters are maximum operation speed information, Wob driving information, and the like of the focus lens 301b. The optical data is spectral transmittance information, distortion correction information, chromatic aberration information, and the like.

Subsequently, the BCPU 220 starts synchronous communication with the LCPU 312 to check the lens information (step S102). Specifically, the BCPU 220 transmits a lens state data request signal that requests lens state data including the lens position of the focus lens 301b for every synchronization period to the LCPU 312 and acquires the lens state data transmitted from the LCPU 312.

Thereafter, the BCPU 220 acquires image data by driving the imaging element drive unit 204 to cause the imaging element 203 to operate for every synchronization period, applies image processing to the acquired image data to display a live view image in the image processing unit 211, and causes the display unit 213 to display the live view image (step S103).

Subsequently, when the moving image switch 212b is operated, if the moving image switch 212b is in an ON state (step S104: Yes), the BCPU 220 starts capturing a moving image (step S105). Specifically, the BCPU 220 drives the imaging element drive unit 204 to cause the imaging element 203 to operate for every synchronization period, sequentially applies image processing to image data that is continuously outputted from the imaging element 203 in the image processing unit 211, and starts storing the image data into the SDRAM 216 or the recording medium 217.

Thereafter, the BCPU 220 performs a moving image AF process for automatically bringing a moving image into focus while capturing the moving image (step S106). The details of the moving image AF process will be described later. The BCPU 220 performs other operations necessary to capture an image, such as photometry and calculation processing of an exposure value in parallel with the moving image AF process.

Subsequently, the BCPU 220 causes the imaging element drive unit 204 to stop the operation of the imaging element 203 and ends capturing the moving image (step S107), and then the BCPU 220 returns to step S103.

In step S104, if the moving image switch 212b is not in the ON state (step S104: No) and the release switch 212a is in the ON state (step S108: Yes), the BCPU 220 performs a still image capturing process in which the image processing unit 211 applies image processing to the image data outputted from the imaging element 203 and the image data is recorded in the recording medium 217 (step S109). Thereafter, the BCPU 220 returns to step S103.

In step S108, if the release switch 212a is not in the ON state (step S108: No) and the power supply of the camera system 1 is in the OFF state (step S110: Yes), the camera system 1 ends the present process. On the other hand, if the power supply of the camera system 1 is not in the OFF state (step S110: No), the camera system 1 returns to step S103.

Figure 6:
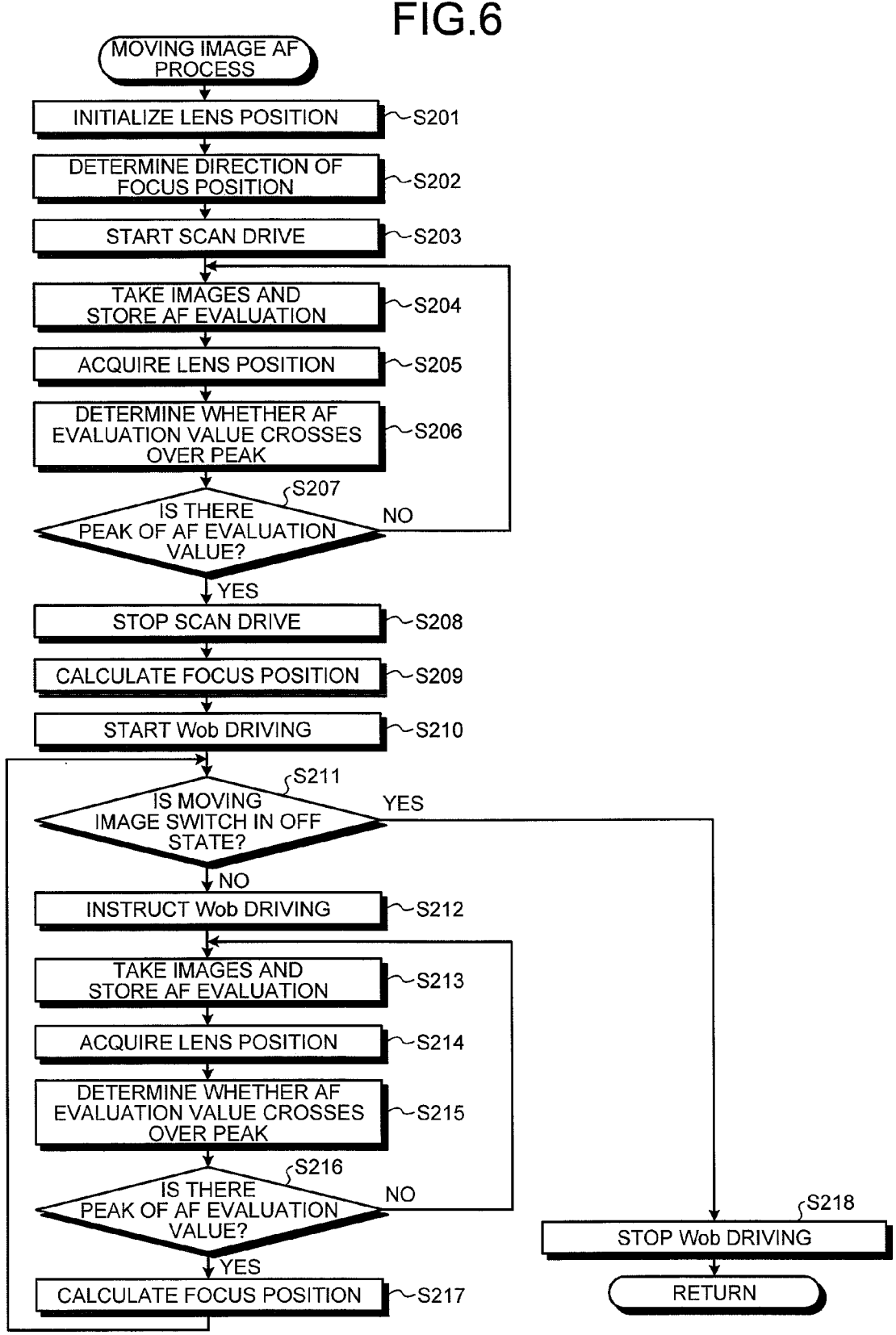
FIG. 6 is a flowchart illustrating an overview of a moving image AF process illustrated in FIG. 5.

Next, the moving image AF process in step S106 in FIG. 5 will be described. FIG. 6 is a flowchart illustrating an overview of the moving image AF process.

As illustrated in FIG. 6, the BCPU 220 performs initialization of the lens position of the focus lens 301b (step S201). Specifically, the BCPU 220 transmits a lens drive signal to drive the focus lens 301b to an initial position to the LCPU 312. Here, the initial position is a central position in a movable range of the focus lens 301b.

Subsequently, the BCPU 220 determines a moving direction to a focus position at which the focus lens 301b is driven to be in focus (step S202). Specifically, the BCPU 220 transmits a drive signal to drive the focus lens 301b from the current position in a specified direction, for example, a close direction to the LCPU 312 and determines the moving direction to the focus position on the basis of the AF evaluation value calculated for every synchronization period and the lens position of the focus lens 301b transmitted from the LCPU 312.

Figure 7:
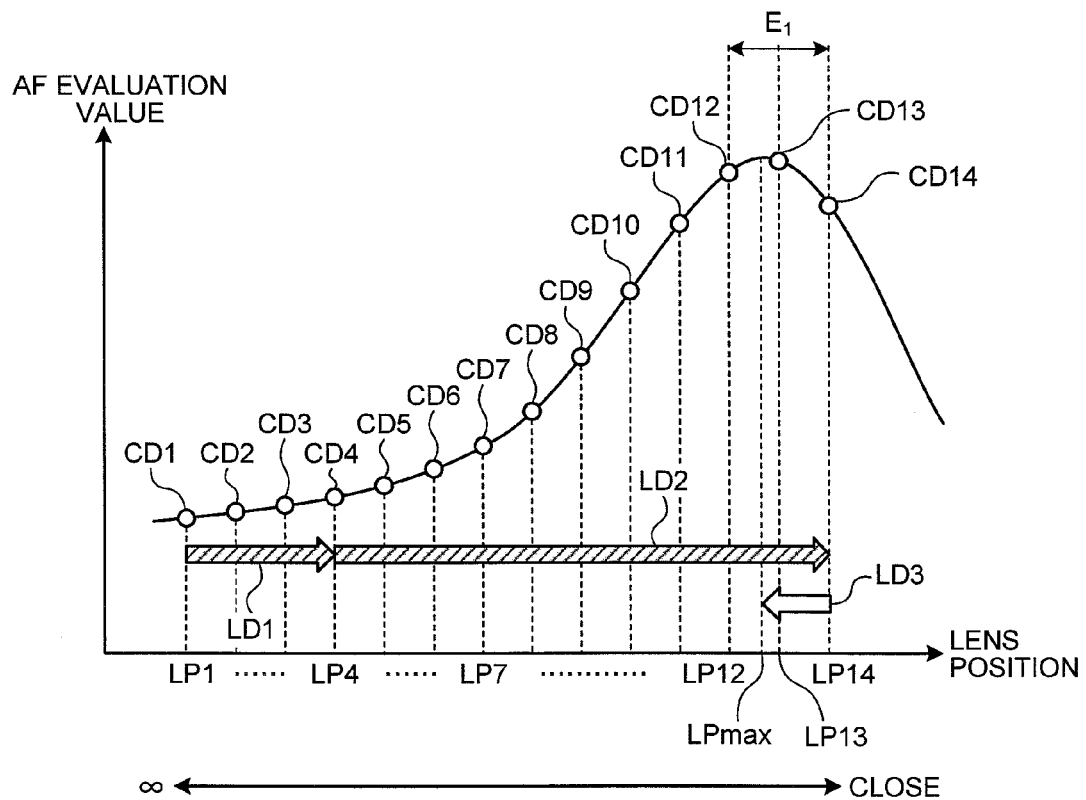
FIG. 7 is a schematic diagram for explaining an example of a moving image AF operation performed by the camera system according to the first embodiment of the present invention.

FIG. 7 is a schematic diagram for explaining an example of a moving image AF operation performed by the camera system 1. In FIG. 7, the vertical axis indicates the AF evaluation value and the horizontal axis indicates the lens position of the focus lens 301b. In FIG. 7, the left side indicates an infinite direction and the right side indicates the close direction. CD1 to CD14 represent the AF evaluation values that are sequentially acquired according to the position of the focus lens 301b. LP1 to LP14 represent the lens positions of the focus lens 301b, which are acquired by the BCPU 220 from the LCPU 312 every time the imaging element 203 performs an imaging operation.

As illustrated in FIG. 7, the BCPU 220 acquires the AF evaluation values CD1 to CD4 and the lens positions LP1 to LP4 of the focus lens 301b in a range of lens drive LD1 for determining direction of four synchronization periods (LD1) from the start of driving the focus lens 301b to the close direction and determines whether or not the AF evaluation value is increasing by the least-squares method or the like. If the AF evaluation value is increasing, the BCPU 220 determines that the close direction is a moving direction to the focus position. On the other hand, if the AF evaluation value is decreasing, the BCPU 220 determines that the infinite direction is a moving direction to the focus position. In FIG. 7, it is assumed that the focus position is in the close direction.

After step S202, the BCPU 220 starts scan drive of the focus position in the direction determined to be the moving direction to the focus position at which the focus lens 301b is in focus (step S203). Specifically, the BCPU 220 transmits a drive signal to drive the focus lens 301b to the focus position to the LCPU 312 as well as calculates the AF evaluation values and detects a peak of the AF evaluation value.

Subsequently, the BCPU 220 drives the imaging element drive unit 204 to cause the imaging element 203 to perform the imaging operation for every synchronization period, causes the image processing unit 211 to calculate the AF evaluation values, and stores the AF evaluation values in the SDRAM 216 in time series (step S204).

Thereafter, the BCPU 220 acquires the lens position of the focus lens 301b for every imaging operation of the imaging element 203 and stores the lens position in the SDRAM 216 in association with the AF evaluation value calculated by the image processing unit 211 (step S205).

Subsequently, the BCPU 220 determines whether or not the AF evaluation value crosses over a peak on the basis of the AF evaluation values stored in the SDRAM 216 (step S206). Specifically, as illustrated in FIG. 7, the BCPU 220 determines that the time point at which the AF evaluation value CD14 is detected and at which the AF evaluation value is changing from increase to decrease is a time point at which the AF evaluation value crosses over the peak. Here, the AF evaluation values are acquired for every synchronization period from the start of driving of the lens driving LD2 to detect the peak of the AF evaluation value toward the close direction of the focus lens 301b on the basis of the lens position LP4 after the direction determination in step S202. In this case, at the time point at which the BCPU 220 determines that the AF evaluation value crosses over the peak, the BCPU 220 associates the maximum (local maximum) value (CD13) of the AF evaluation value and the values before and after the maximum value (CD12 and CD14) with the lens positions (LP13, LP12, and LP14) at the time points at which these AF evaluation values are acquired and store the AF evaluation values and the lens positions in the SDRAM 216 as data for calculating the focus position.

Thereafter, if the BCPU 220 determines that the AF evaluation value crosses over the peak (step S207: Yes) in a determination of AF evaluation value crossing over the peak in step S206, the camera system 1 proceeds to step S208 described later. On the other hand, if the BCPU 220 determines that the AF evaluation value does not cross over the peak (step S207: No) in the determination of AF evaluation value crossing over the peak in step S206, the camera system 1 returns to step S204.

In step S208, the BCPU 220 stops the scan drive of the focus lens 301b to detects the peak of the AF evaluation value (step S208). Specifically, when the BCPU 220 detects the peak of the AF evaluation value, the BCPU 220 transmits a drive stop signal of the focus lens 301b to the LCPU 312.

Subsequently, the BCPU 220 calculates the focus position of the camera system 1 on the basis of the data for calculating the focus position recorded in the SDRAM 216 (step S209). Specifically, the BCPU 220 calculates the focus position of the camera system 1 (see LPmax in FIG. 7) by a three-point compensation calculation. Further, the BCPU 220 sets the center of the vibration when Wob-driving the focus lens 301b to the focus position (LPmax in FIG. 7) and sets a range before and after the set focus position (CD12 to CD14) as the driving range of the Wob driving ($E_1$ in FIG. 7). The calculation method of the focus position is not limited to the aforementioned three-point compensation calculation, and the focus position may be calculated by other methods such as, for example, a quadratic function approximate calculation.

Subsequently, the BCPU 220 causes the focus lens 301b to start the Wob driving (step S210). Specifically, the BCPU 220 transmits a drive signal to the LCPU 312.

Subsequently, the BCPU 220 determines whether or not the moving image switch 212b is in the OFF state (step S211). If the BCPU 220 determines that the moving image switch 212b is not in the OFF state (step S211: No), the BCPU 220 instructs the focus lens 301b to perform Wob driving (step S212). Specifically, the BCPU 220 transmits a drive signal and transmits a Wob parameter to perform Wob driving to the LCPU 312. Here, the Wob parameter is a parameter including an amplitude of the Wob driving ($E_1$ in FIG. 7) and the amount of movement from the vibration center (LPmax in FIG. 7) to the target value.

Step S213 to step S216 correspond to step S204 to step S207 described above, respectively.

Figure 8:
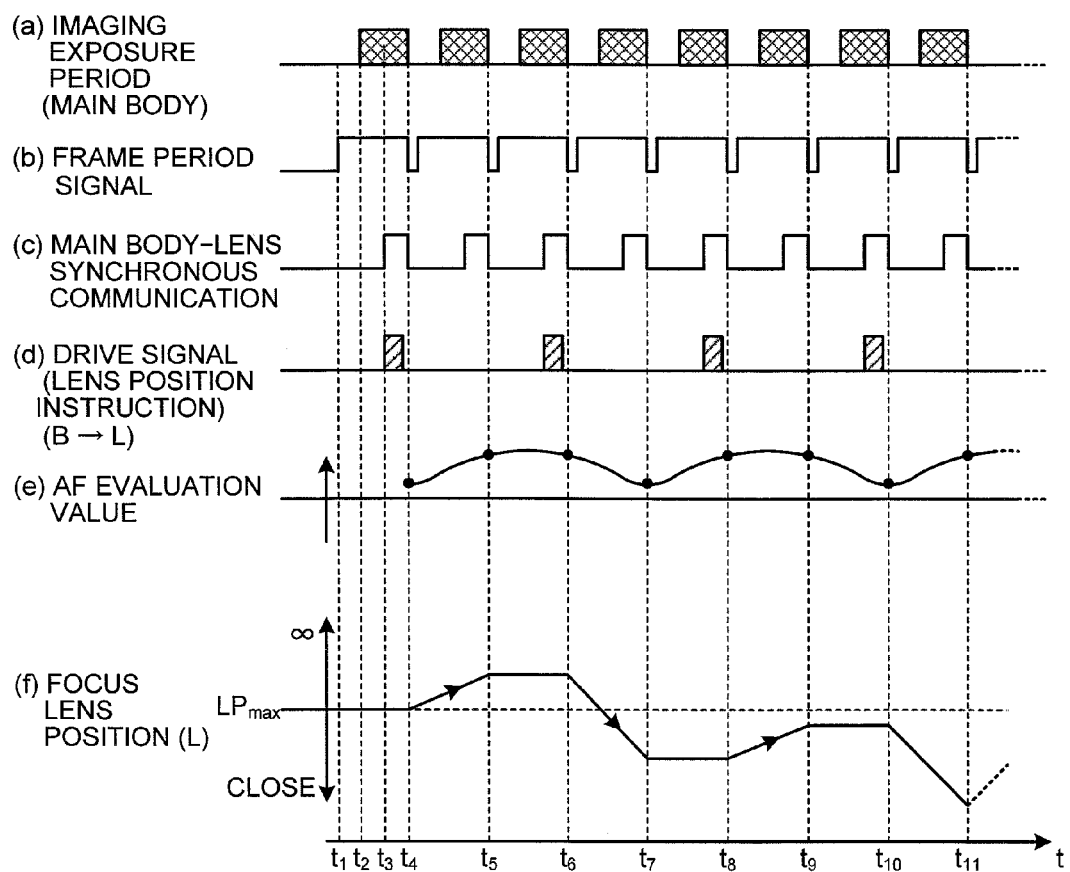
FIG. 8 is a timing chart illustrating processing timing of each unit during the moving image AF process of a control unit.

Here, timing of each unit during the moving image AF process of the BCPU 220 from step S213 to step S216 will be described. FIG. 8 is a timing chart illustrating processing timing of each unit during the moving image AF process of the BCPU 220.

As illustrated in FIG. 8(b), the BCPU 220 periodically generates a frame period signal (vertical synchronizing signal VD) (for example, timing $t_1$).

Further, as illustrated in FIG. 8(a), the BCPU 220 causes the imaging element 203 to generate image data (for example, timing $t_2$) by controlling the drive of the imaging element drive unit 204 and the exposure of the imaging element 203 in synchronization with the frame period signal.

Subsequently, as illustrated in FIG. 8(c), the BCPU 220 performs main body—lens synchronous communication based on the frame period signal and transmits a drive signal to the lens device 3 (for example, timing $t_3$). At this time, the BCPU 220 acquires lens position information of the focus lens 301b from the interchangeable lens device 3.

Thereafter, as illustrated in FIG. 8(d), the LCPU 312 Wob-drives the focus lens 301b on the basis of the drive signal. For example, the LCPU 312 moves the focus lens 301b toward the infinite side (for example, timing $t_4$) or moves the focus lens 301b toward the close side (for example, timing $t_5$). The detailed operation of the LCPU 312 will be described later.

Subsequently, as illustrated in FIG. 8(e), the BCPU 220 calculates the AF evaluation value (AF1) based on the acquired image data and stores the AF evaluation value in the SDRAM 216 (for example, timing $t_4$).

In this way, in the camera system 1, each unit is driven based on the frame period signal generated by the BCPU 220, so that the Wob driving during the moving image AF process is performed. Thereby, a moving image can be captured while focusing an object at all times.

Let us return to FIG. 6. Step S217 and the subsequent steps will be described. In step S217, the BCPU 220 calculates the focus position of the camera system 1 on the basis of the data for calculating the focus position stored in the SDRAM 216. Thereafter, the camera system 1 returns to step S211.

A case in which the BCPU 220 determines that the moving image switch 212b is in the OFF state in step S211 (step S211: Yes) will be described. In this case, the BCPU 220 stops the Wob driving of the focus lens 301b (step S218). Specifically, the BCPU 220 transmits a drive stop signal to stop the Wob driving of the focus lens 301b to the LCPU 312. After step S218, the camera system 1 returns to the main routine illustrated in FIG. 5.

Figure 9:
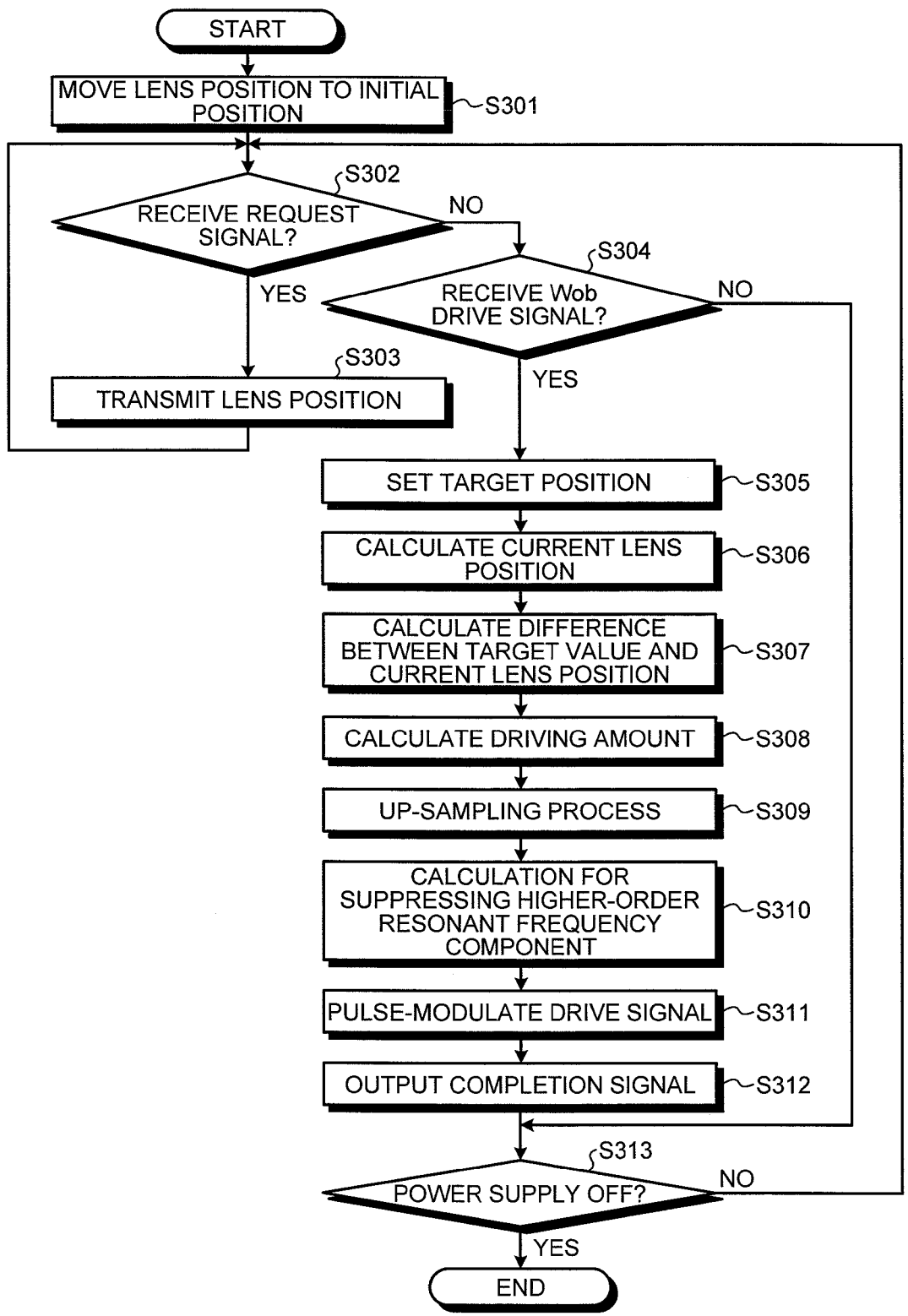
FIG. 9 is a flowchart illustrating an overview of a process performed by the lens controller.
Figure 10:
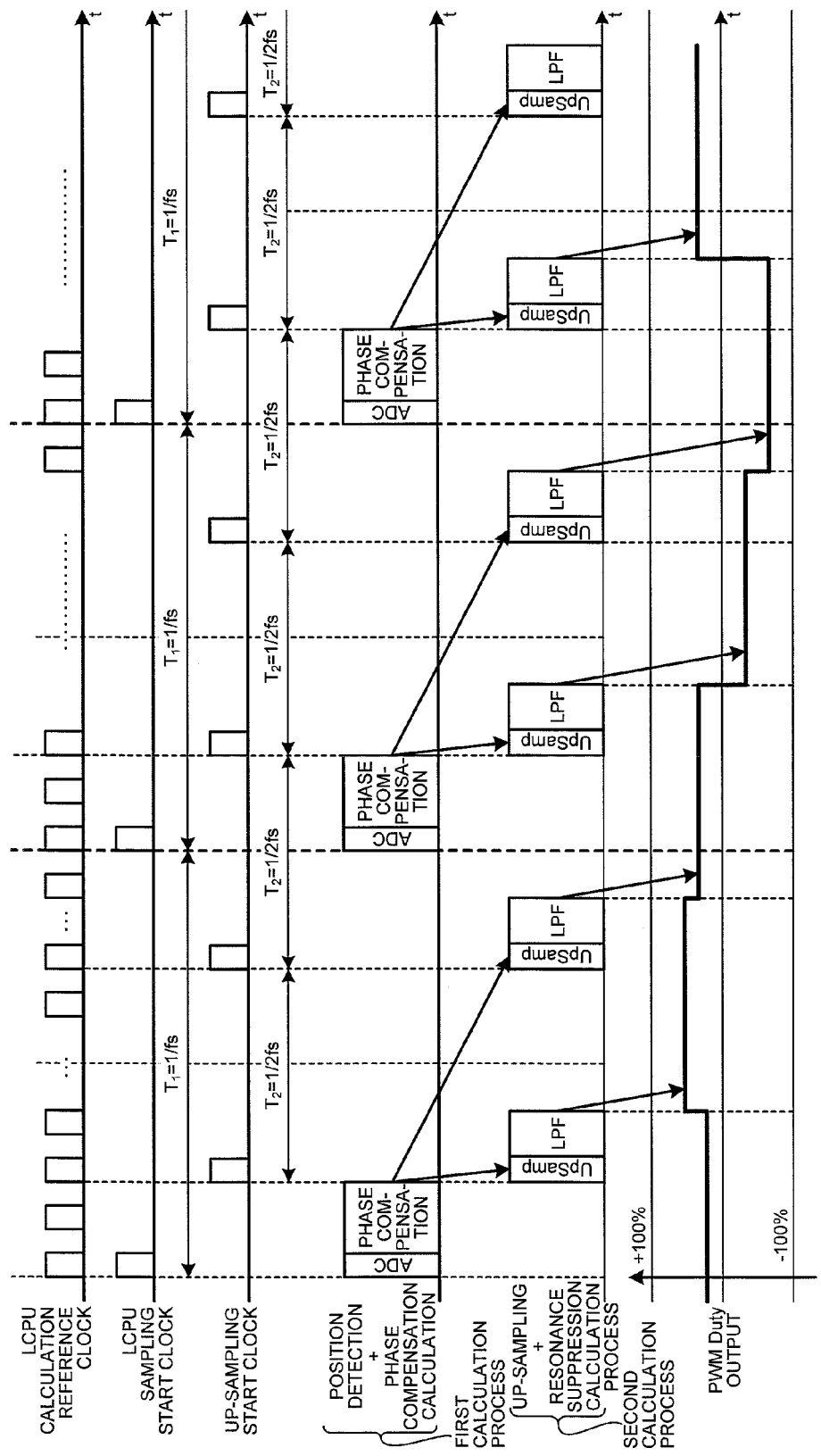
FIG. 10 is a timing chart illustrating processing timing of each unit during the moving image AF process of the lens controller.

Next, the operation performed by the LCPU 312 of the interchangeable lens device 3 will be described. FIG. 9 is a flowchart illustrating an overview of a process performed by the LCPU 312 of the interchangeable lens device 3. FIG. 10 is a timing chart illustrating processing timing of each unit during the moving image AF process of the LCPU 312.

As illustrated in FIG. 9, the LCPU 312 moves the lens position of the focus lens 301b to the initial position by driving the lens drive unit 302 on the basis of the drive signal inputted from the BCPU 220 (step S301).

Subsequently, when the LCPU 312 receives a lens state request signal that requests the lens state of the focus lens 301b (step S302: Yes), the LCPU 312 transmits the lens position of the focus lens 301b to the BCPU 220 (step S303). Specifically, the lens position calculator 404 of the LCPU 312 calculates the lens position of the focus lens 301b on the basis of the lens position signal inputted from the lens position detector 307 through the A/D converter 402 and the sample-hold unit 403 and transmits a lens position signal indicating the calculation result to the BCPU 220. Thereafter, the LCPU 312 returns to step S302.

In step S302, if the LCPU 312 does not receive the lens state request signal that requests the lens state of the focus lens 301b from the BCPU 220 (step S302: No) and receives a Wob drive signal to Wob-drive the focus lens 301b (step S304: Yes), the focus lens target value setting unit 406 sets a target position signal that indicates the target position of the focus lens 301b based on the Wob drive signal received through the lens communication unit 311 and the transmitting/receiving unit 405 and outputs the set target position signal to the subtracter 407 (step S305).

Subsequently, the lens position calculator 404 calculates the lens position of the focus lens 301b according to a sampling start clock (step S306). Specifically, as illustrated in FIG. 3, the lens position calculator 404 calculates the lens position of the focus lens 301b (hereinafter referred to as "ADC process") on the basis of the lens position signal outputted from the lens position detector 307 through the A/D converter 402 and the sample-hold unit 403 according to the first period ($T_1$) and transmits a lens position signal that indicates the focus lens position obtained as a calculation result to the subtracter 407.

Thereafter, the subtracter 407 calculates a difference between the target value inputted from the focus lens target value setting unit 406 and the lens position signal inputted from the lens position calculator 404 and outputs a signal obtained by this calculation to the phase compensation calculator 408 (step S307).

Subsequently, the phase compensation calculator 408 calculates a driving amount of the focus lens 301b driven by the lens drive unit 302 when the focus lens 301b is controlled to follow up the target position on the basis of the signal inputted from the subtracter 407 (step S308). Specifically, the FB calculator 408a of the phase compensation calculator 408 calculates a control amount that adjusts the driving amount of the focus lens 301b driven by the lens drive unit 302 on the basis of the difference inputted from the subtracter 407 and outputs a signal obtained by this calculation to the adder 408c. The FF calculator 408b of the phase compensation calculator 408 calculates a driving amount of the focus lens 301b driven by the lens drive unit 302 on the basis of a target value signal inputted from the focus lens target value setting unit 406 and outputs a signal obtained by this calculation to the adder 408c. The adder 408c calculates the sum of the signal inputted from the FB calculator 408a and the signal inputted from the FF calculator 408b and outputs the sum to the up-sampling unit 409.

Here, transmission characteristics of the phase compensation calculator 408 will be described. When the frequency of the input signal is f (Hz), if the sampling frequency is set to $f_s = 1/T_1$ (Hz) and the transmission characteristics of the frequency of the phase compensation calculator 408 is set to G(f), according to the sampling theorem, an operation amount (driving amount) with respect to an input frequency component can be only calculated and outputted correctly in a frequency band of $f < f_s/2$ (Nyquist frequency).

On the other hand, when the frequency of the input signal is $f_s/2 < f < f_s$, the following formula (7) is established.

$$G(f) = G(f_s/2 - (f - (f_s/2))) \quad (7)$$

The formula (7) indicates that the transmission characteristics of the frequency of the input signal has characteristics in which the transmission characteristics of the frequency show a folding back at a frequency lower than or equal to the Nyquist frequency with the Nyquist frequency as the axis of symmetry (hereinafter referred to as "aliasing characteristics").

When the frequency of the input signal is $f_s < f < 1.5 \, f_s$, the following formula (8) is established.

$$G(f) = G(f - f_s) \quad (8)$$

The formula (8) indicates that the transmission characteristics of the frequency of the input signal is the same as the transmission characteristics of a frequency shifted by the sampling frequency.

Figure 11:
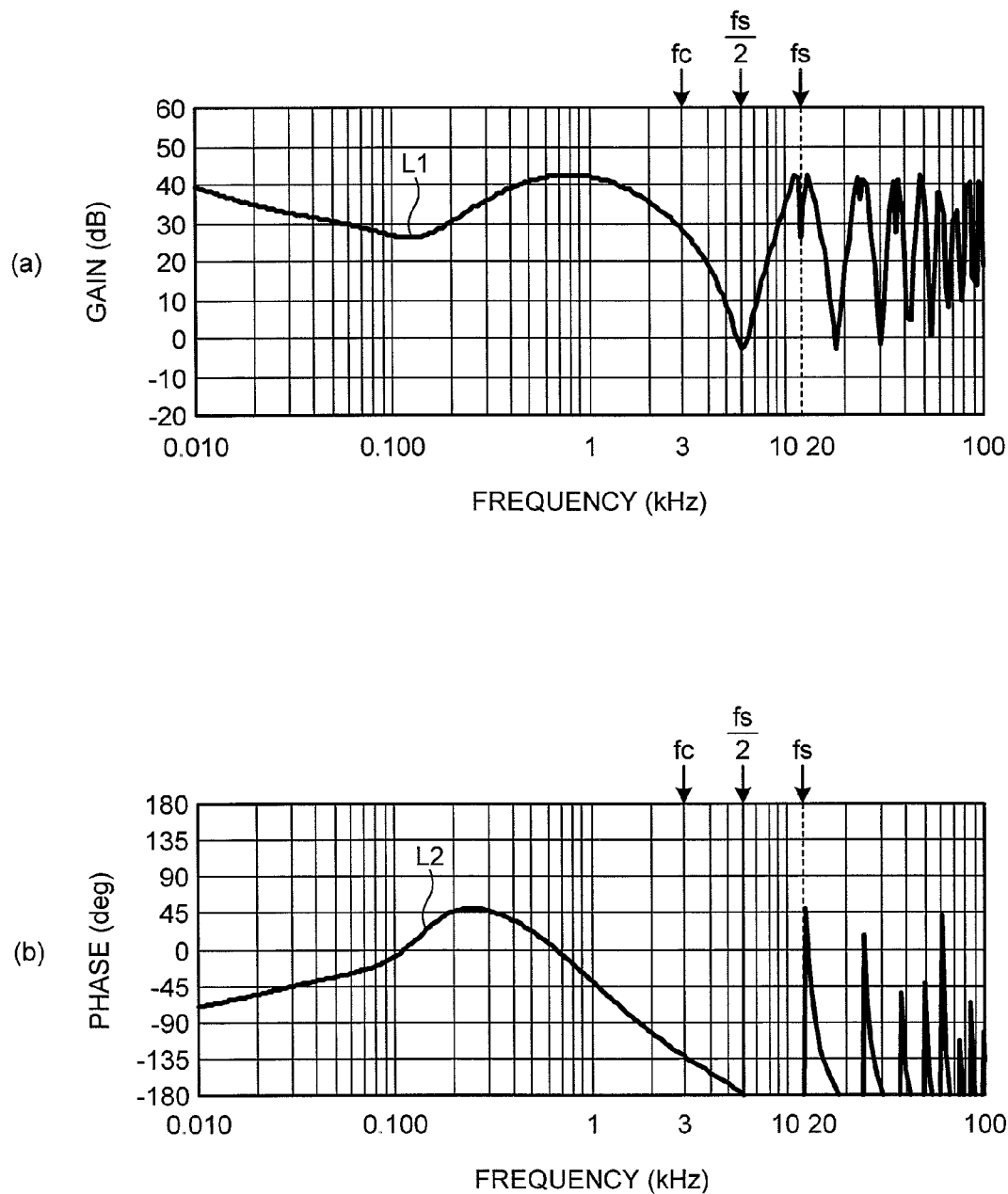
FIG. 11 is a Bode diagram of transmission characteristics of a processing result of a phase compensation calculator.

FIG. 11 is a Bode diagram illustrating the transmission characteristics of a processing result of the phase compensation calculator 408. Specifically, FIG. 11(a) is a Bode diagram illustrating frequency characteristics of gain and FIG. 11(b) is a Bode diagram illustrating frequency characteristics of phase. In FIG. 11, it is assumed that the sampling frequency ($f_s$) is 12 kHz.

As illustrated in FIG. 11, the transmission characteristics of the phase compensation calculator 408 increase the gain of the frequency band to be followed up in a frequency band of $f < f_s/2$, so that the gain is increased in a frequency band of 100 Hz or lower by phase lag compensation characteristics. Further, according to the transmission characteristics of the phase compensation calculator 408, the gain crossover frequency (fast response) of open-loop characteristics is about 200 Hz to 300 Hz and a control stability (phase margin) of the gain crossover frequency is secured, so that phase leading calculation is performed by the phase lead compensation. However, when the higher-order resonant frequency of the lens drive unit 302 is located in a frequency range higher than $f_s/2$, the phase compensation calculator 408 folds transmission gain for outputting a focus lens operation amount to increase and output the transmission gain, with respect to a frequency domain that cannot be controlled by the FB calculator 408a of the phase compensation calculator 408, by the aliasing characteristics. Therefore, the LCPU 312 performs a second calculation process (step S309 to step S310) described later in order to cancel out the increase of the transmission gain due to the aliasing characteristics shown by the formula (5).

Let us return to FIG. 9. Step S309 and the subsequent steps will be described. In step S309, the up-sampling unit 409 performs an up-sampling process (hereinafter referred to as "UpSamp") on the signal inputted from the phase compensation calculator 408 according to each up-sampling clock ($T_2 = \frac{1}{2}f_s$) (see FIG. 10), which is the integral multiple of the period $T_1$ in the phase compensation calculator 408, and outputs the result of the process to the resonance suppression calculator 410.

Subsequently, the resonance suppression calculator 410 performs calculation processing, which suppresses a higher-order resonant frequency component, on the signal inputted from the up-sampling unit 409 and outputs the calculation result to the PWM modulator 411 (step S310). Specifically, the resonance suppression calculator 410 suppresses an output near the higher-order resonant frequency included in the signal by performing low-pass filter processing (hereinafter referred to as "LPF processing").

The transmission characteristics of the low-pass filter characteristics have the aliasing characteristics in which the gain is fold at $f_{s2}/2$ (Hz) that is the Nyquist frequency of the up-sampling frequency $f_{s2}$ (Hz). Therefore, an output suppression frequency range by the second calculation process is $f_c$ (Hz) to $f_c+(f_{s2}/2)$ (Hz). That is, in the first embodiment, the output suppression frequency range by the second calculation result can be set by setting the up-sampling frequency $f_{s2}$ of the up-sampling unit 409 and the cut-off frequency $f_c$. Further, when calculation results (hereinafter referred to as a "first calculation process") by the lens position calculator 404, the focus lens target value setting unit 406, and the phase compensation calculator 408 are updated, the second calculation process LCPU 312 calculates an operation amount to drive the lens drive unit 302 by performing the second calculation process on the basis of the updated results of the first calculation process. On the other hand, when the results of the first calculation process are not updated, the second calculation process LCPU 312 calculates the operation amount to drive the lens drive unit 302 by performing the second calculation process on the basis of the results of the first calculation process which are previously referred to.

Figure 13:
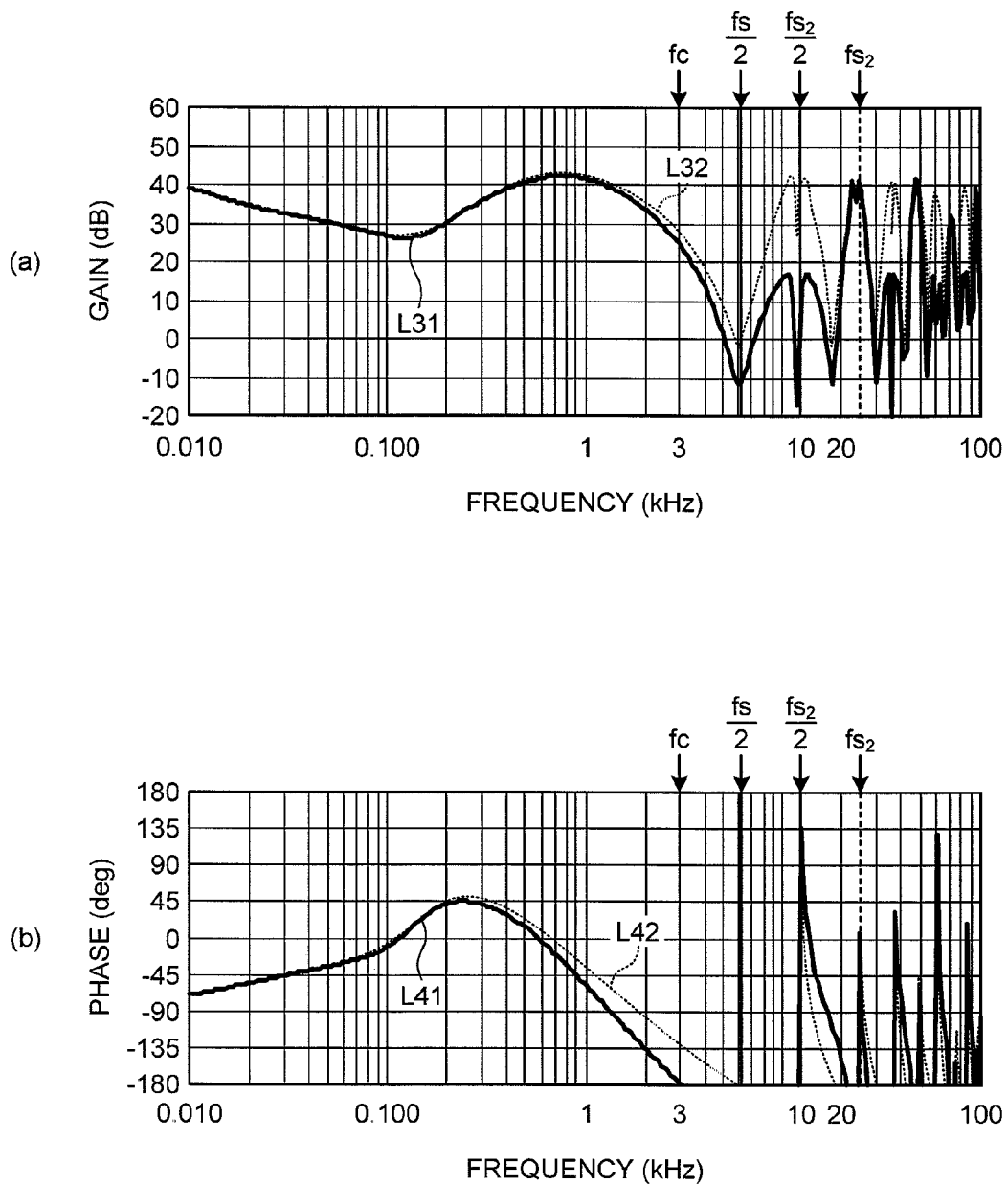
FIG. 13 is a Bode diagram of transmission characteristics of a result obtained when a second calculation process is performed on a first calculation result.
Figure 14:
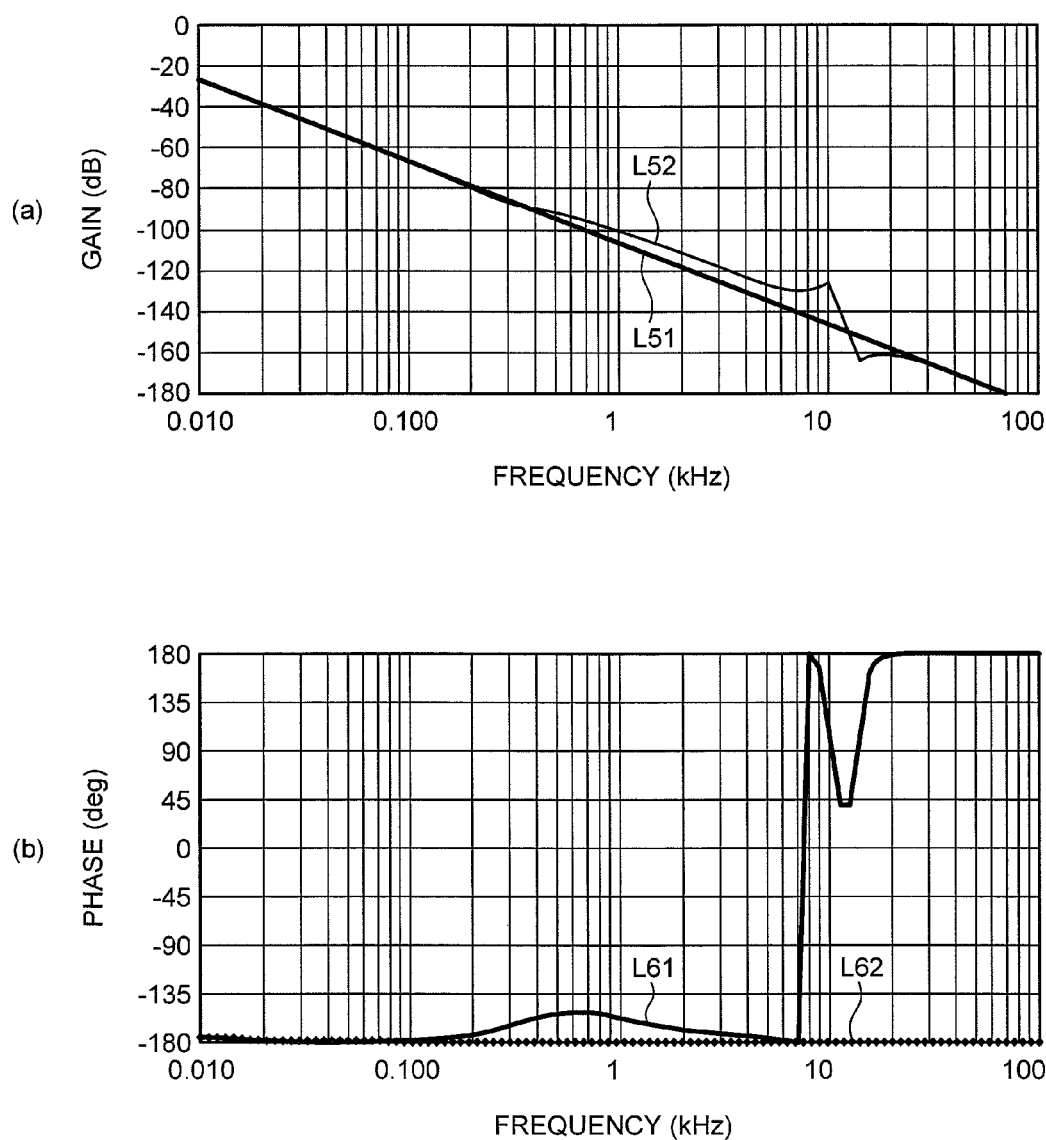
FIG. 14 is a Bode diagram of transmission characteristics of a lens drive unit.

FIG. 12 is a Bode diagram illustrating transmission characteristics of the second processing result. FIG. 13 is a Bode diagram illustrating transmission characteristics of a result obtained by performing the second calculation process on the first calculation process. FIG. 14 is a Bode diagram illustrating transmission characteristics of the lens drive unit 302. In FIG. 12(a), a curve L11 represents gain characteristics of an IIR filter calculation and a curve L12 represents gain characteristics of an input frequency. In FIG. 12(b), a curve L21 represents phase characteristics of the IIR filter calculation and a curve L22 represents phase characteristics of the input frequency. In FIG. 13(a), a curve L31 represents gain characteristics of the second calculation process and a curve L32 represents gain characteristics of the first calculation result. In FIG. 13(b), a curve L41 represents phase characteristics of the second calculation process and a curve L42 represents phase characteristics of the first calculation result. In FIG. 14(a), a curve L51 represents an image gain of the lens drive unit 302 and a curve L52 represents a gain of the lens drive unit 302. In FIG. 14(b), a curve L61 represents an image phase of the lens drive unit 302 and a curve L62 represents a phase of the lens drive unit 302. In FIG. 12 and FIG. 13, it is assumed that the up-sampling frequency is 24 kHz.

As illustrated in FIGS. 12 to 14, it is possible to suppress an output component of the frequency band of 3 kHz to 20 kHz included in a driving amount signal that drives the focus lens 301b by the lens drive unit 302 by adding the calculation result of the second calculation process (see FIG. 12) to the calculation result of the first calculation process (see FIG. 11). In this way, even when the higher-order resonant frequency band of the lens drive unit 302 is located in the audible frequency range (see FIG. 14), it is possible to suppress the vibration and the noise due to the resonant frequency so that the vibration and the noise are difficult to be excited.

Let us return to FIG. 9. Step S311 and the subsequent steps will be described. In step S311, the PWM modulator 411 outputs a pulse signal generated by PWM-modulating the signal inputted from the resonance suppression calculator 410 to the lens drive driver 302a and drives a VCM 302b.

Subsequently, the movement completion determination unit 413 outputs a signal indicating that the movement of the focus lens 301b is completed to the BCPU 220 through the transmitting/receiving unit 405 and the lens communication unit 311 (step S312).

Thereafter, if the power supply is in the OFF state (step S313: Yes), the LCPU 312 ends the present process. On the other hand, if the power supply is not in the OFF state (step S313: No), the LCPU 312 returns to step S302.

A case will be described in which, in step S304, the LCPU 312 does not receive the lens state request signal that requests the lens state of the focus lens 301b from the BCPU 220 (step S302: No) and does not receive the Wob drive signal that Wob-drives the focus lens 301b (step S304: No). In this case, the LCPU 312 proceeds to step S313.

According to the first embodiment of the present invention described above, the phase compensation calculator 408 samples the target position signal inputted from the focus lens target value setting unit 406 and the position signal inputted from the lens position calculator 404 for each first period and calculates the driving amount signal that indicates the driving amount of the focus lens 301b driven by the lens drive unit 302 on the basis of the sampled target position signal and position signal, the up-sampling unit 409 performs the up-sampling at the second time period which is a period obtained by dividing the first time period by an integer, and the resonance suppression calculator 410 performs a calculation to suppress the higher-order resonant frequency component of the resonant frequency unique to the interchangeable lens device 3 on the driving amount signal up-sampled by the up-sampling unit 409. As a result, it is possible to reduce the noise generated by the AF operation at a high-speed frame rate while a moving image is being captured.

Further, according to the first embodiment of the present invention, the parameter change unit 412 changes the second time period in the up-sampling unit 409 and the cut-off frequency of the resonance suppression calculator 410 on the basis of the instruction signal of the BCPU 220. As a result, it is possible to appropriately change the higher-order resonant frequency according to solid variation and temperature variation of the higher-order resonant frequency characteristics unique to the interchangeable lens device 3, so that different higher-order resonant frequency components can be suppressed.

(Second Embodiment)

Next, a second embodiment of the present invention will be described. In the camera system according to the second embodiment of the present invention, the configuration of the resonance suppression calculator is different from that of the camera system described above. Therefore, in the description below, the configuration different from that of the above first embodiment will be described, and thereafter, the effects of the camera system according to the second embodiment of the present invention will be described. In the description of the drawings, the same components are given the same reference numerals.

Figure 15:
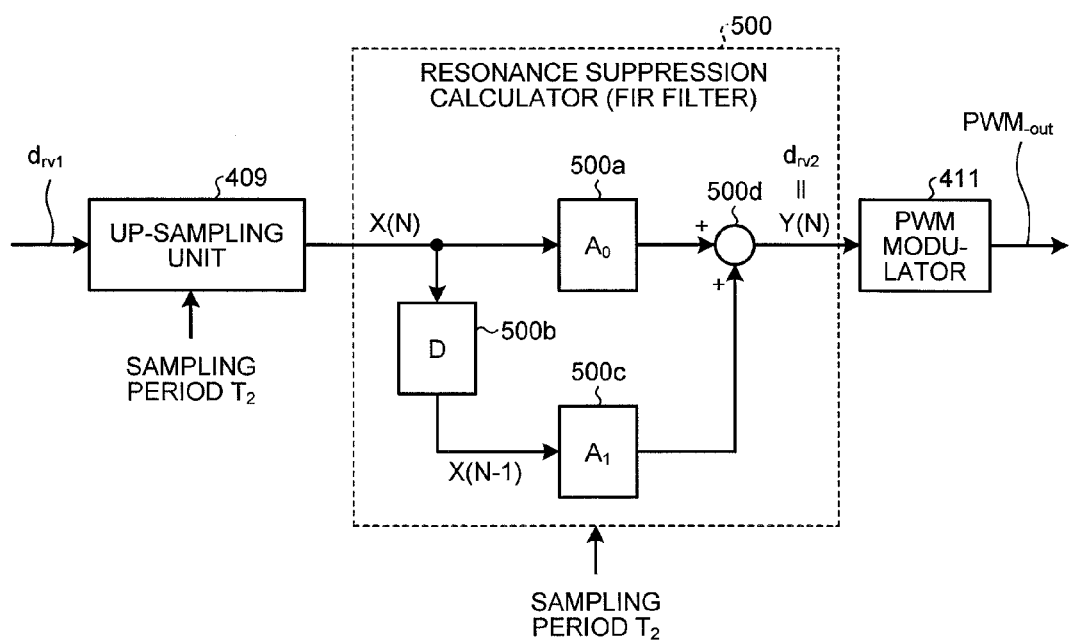
FIG. 15 is a block diagram illustrating a configuration of a resonance suppression calculator according to a second embodiment of the present invention.

FIG. 15 is a block diagram illustrating a configuration of a resonance suppression calculator 500. As illustrated in FIG. 15, the resonance suppression calculator 500 is formed by an FIR (Finite Impulse Response) filter that averages the previous signal calculated by the phase compensation calculator 408 and the latest signal. The resonance suppression calculator 500 includes a multiplier 500a, a delay element 500b, a multiplier 500c, and an adder 500d.

The multiplier 500a multiplies the input signal X(N) from the up-sampling unit 409 by a specified number ($A_0$) and outputs the multiplied signal. The delay element 500b outputs a value X(N−1) sampled in the previous sampling period at the output timing of the input signal from the up-sampling unit 409. The multiplier 500c multiplies the output signal from the delay element 500b by a specified number ($A_1$) and outputs the multiplied signal. The adder 500d calculates the sum of the output signal of the multiplier 500a and the output signal of the multiplier 500c and outputs the sum.

When the input signal from the up-sampling unit 409 is X(N) and the output signal of the adder 500d is Y(N), the output signal of the multiplier 500a is represented by $A_0 X(N)$, the output signal of the delay element 500b is represented by X(N−1), and the output signal of the multiplier 500c is represented by $A_1 X(N−1)$. Therefore, the output signal Y(N) of the resonance suppression calculator 500 is represented by the following recurrence formula (9):

$$Y(N)=A_0 \cdot X(N)+A_1 \cdot X(N-1) \quad (9)$$

The coefficients $A_0$ and $A_1$ of the formula (9) are defined by the following formula (10) in an addition average calculation of a previously sampled input and a current input.

$$A_0=A_1=0.5 \quad (10)$$

Figure 17:
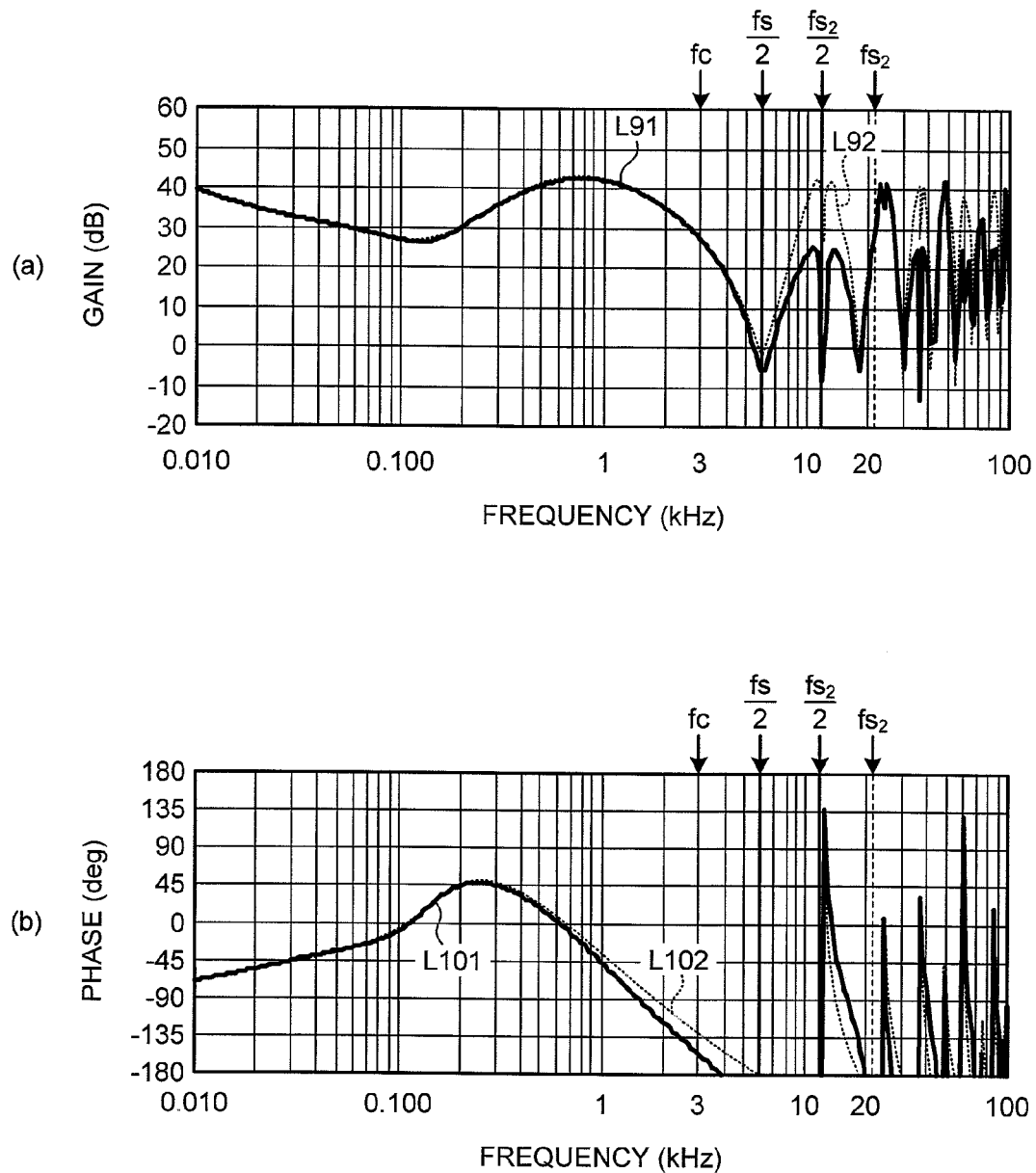
FIG. 17 is a Bode diagram of transmission characteristics of a calculation result obtained when the second calculation process performs a calculation on a calculation result of a first calculation process.

FIG. 16 is a Bode diagram illustrating transmission characteristics to which a calculation result of a second calculation process according to the second embodiment is added. FIG. 17 is a Bode diagram illustrating transmission characteristics of a calculation result obtained when the second calculation process performs a calculation on a calculation result of a first calculation process. In FIG. 16(a), a curve L71 represents gain characteristics of an FIR filter calculation and a curve L72 represents gain characteristics of an input frequency. In FIG. 16(b), a curve L81 represents phase characteristics of the FIR filter calculation and a curve L82 represents phase characteristics of the input frequency. In FIG. 17(a), a curve L91 represents gain characteristics of the second calculation process and a curve L92 represents gain characteristics of the first calculation process. In FIG. 17(b), a curve L101 represents phase characteristics of the second calculation process and a curve L102 represents phase characteristics of the first calculation process.

As illustrated in FIG. 16 and FIG. 17, the transmission characteristics of the FIR filter have characteristics which, when the up-sampling frequency is $f_{s2}$ (Hz), most suppress the transmission gain at the Nyquist frequency $f_{s2}/2$ of the up-sampling frequency $f_{s2}$, and have a suppression frequency band near the Nyquist frequency $f_{s2}/2$ of the up-sampling frequency $f_{s2}$ due to the aliasing characteristics. Thereby, it is possible to suppress an output component of the frequency band of 3 kHz to 20 kHz included in the driving amount of the focus lens driven by the lens drive unit 302 by adding the calculation result of the second calculation process to the calculation result of the first calculation process (see FIG. 11). In this way, even when the higher-order resonant frequency band of the lens drive unit 302 is located in the audible frequency range (see FIG. 14), it is possible to suppress the vibration and the noise due to the resonant frequency so that the vibration and the noise are difficult to be excited.

According to the second embodiment of the present invention described above, the resonance suppression calculator 500 is formed by an FIR filter, so that it is possible to shorten the processing time of the calculation processing performed on the driving amount signal as compared with the IIR filter and reduce the noise generated by the AF operation at a high-speed frame rate while a moving image is being captured.

Further, according to the second embodiment of the present invention, it is possible to reduce the number of steps of the product-sum calculation by the resonance suppression calculator 500 averaging the driving amount signal sampled in the previous period and the latest driving amount signal. As a result, the LCPU 312 can shorten the calculation processing time.

(Other Embodiments)

In the embodiments described above, the cut-off frequency ($f_c$), at which the resonance suppression calculator cuts off the higher-order resonant frequency, is set to 3 kHz. However, the cut-off frequency ($f_c$) may be appropriately changed according to the configuration of the interchangeable lens device. Specifically, when the cut-off frequency $f_c$ is set to lower than or equal to ½ of the up-sampling frequency (Nyquist frequency), it is possible to suppress a driving amount signal component in a frequency band higher than ½ of the sampling frequency $f_s$ (Nyquist frequency) used in the calculation result of the first calculation process.

In the embodiments described above, the up-sampling frequency, which is two times the sampling frequency of the phase compensation calculator, is used. However, the up-sampling frequency may be, for example, three times, four times, or five times the sampling frequency of the phase compensation calculator.

In the embodiments described above, the phase compensation calculator performs a calculation by the phase lead compensation and the phase lag compensation. However, the calculation may be a PID calculation in which a proportional calculation, a time change (differential calculation), and an integration (integral calculation) are performed on a difference and the calculation results are summed up.

In the embodiments described above, a band-pass filter may be used as the resonance suppression calculator and various parameters related to the cut-off frequency and the sampling frequency may be changed by the parameter change unit.

In the embodiments described above, the resonance suppression calculator may include a plurality of types of filters and the type of the filter may be changed by the parameter change unit. For example, the parameter change unit may appropriately change the IIR filter and the FIR filter on the basis of the frame rate of a moving image.

In the embodiments described above, a digital single lens reflex camera is described as the camera system. However, the embodiments can be applied to a compact digital camera and a digital video camera in which a lens and a main body are integrally formed and electronic devices such as a mobile phone and a tablet type portable device which have a moving image function.

REFERENCE SIGNS LIST

1 CAMERA SYSTEM
2 MAIN BODY UNIT
3 INTERCHANGEABLE LENS DEVICE
201 SHUTTER
202 SHUTTER DRIVE UNIT
203 IMAGING ELEMENT
204 IMAGING ELEMENT DRIVE UNIT
205 SIGNAL PROCESSING UNIT
206, 402 A/D CONVERTER
209 AUDIO INPUT/OUTPUT UNIT
210 AUDIO SIGNAL PROCESSING UNIT
211 IMAGE PROCESSING UNIT
212 INPUT UNIT
212a RELEASE SWITCH
212b MOVING IMAGE SWITCH
213 DISPLAY UNIT
214 DISPLAY DRIVE UNIT
219 MAIN BODY COMMUNICATION UNIT
220 CONTROL UNIT
301 OPTICAL SYSTEM
301b FOCUS LENS

302 LENS DRIVE UNIT
307 LENS POSITION DETECTOR
311 LENS COMMUNICATION UNIT
312 LENS CONTROLLER
400 OPERATION CLOCK GENERATOR
401 SAMPLING SYNCHRONIZATION GENERATOR
403 SAMPLE-HOLD UNIT
404 LENS POSITION CALCULATOR
405 TRANSMITTING/RECEIVING UNIT
406 FOCUS LENS TARGET VALUE SETTING UNIT
407 SUBTRACTER
408 PHASE COMPENSATION CALCULATOR
408a FB CALCULATOR
408b FF CALCULATOR
408c ADDER
409 UP-SAMPLING UNIT
410, 500 RESONANCE SUPPRESSION CALCULATOR
411 PWM MODULATOR

The invention claimed is:

1. A camera device including an imaging element for generating image data by performing photoelectric conversion, the camera device comprising:
a focus lens that adjusts a focus position of an object whose image is formed on an imaging surface of the imaging element;
a lens drive unit that drives the focus lens forward and backward along an optical axis direction of the camera device;
a lens position detector that detects a lens position of the focus lens on the optical axis;
a lens controller that controls the lens drive unit; and
a control unit that controls an image capturing operation when the camera device captures an image,
wherein the lens controller includes:
a driving amount calculator that samples, for each first time period, a lens position signal indicating the lens position detected by the lens position detector and a target position signal indicating a target position of the focus lens on the optical axis, the target position signal being transmitted from the control unit and calculates a driving amount output of the focus lens based on the sampled lens position signal and target position signal;
an up-sampling unit that performs up-sampling on the driving amount output obtained by the driving amount calculator at a second time period which is a period obtained by dividing the first time period by an integer; and
a resonance suppression calculator that performs calculation on a result obtained by sampling the driving amount output at the second time period to suppress a higher-order resonant frequency component in a specified resonant frequency band.

2. The camera device according to claim 1, wherein the resonance suppression calculator sets a cut-off frequency for cutting off the higher-order resonant frequency component to lower than or equal to ½ of a sampling frequency that is an inverse of the second time period and performs digital filter calculation processing having characteristics that cause frequencies lower than the cut-off frequency to pass through.

3. The camera device according to claim 2, wherein the resonance suppression calculator obtains the driving amount output by performing the digital filter calculation processing to be a primary IIR filter form at primary low-pass filter characteristics, on a calculation value obtained when sampling is performed at the second time period.

4. The camera device according to claim 2, wherein
the resonance suppression calculator is an FIR filter type digital filter, and
the resonance suppression calculator obtains the driving amount output of the focus lens by averaging a calculation value sampled at the second time period and a calculation value sampled at the previous time period.

5. The camera device according to claim 2, wherein the lens controller further includes
a parameter change unit that changes a setting value of a cut-off frequency band for cutting off the resonant frequency band based on an instruction signal transmitted from the control unit.

6. The camera device according to claim 2, wherein the driving amount calculator includes:
a feedback calculator that calculates a control amount for adjusting the driving amount output by the lens drive unit based on a difference between the lens position signal and the target position signal;
a feed forward calculator that calculates the driving amount output by the lens drive unit based on the target position signal while the focus lens is moving; and
an adder that outputs the driving amount output obtained by calculating a sum of the control amount calculated by the feedback calculator and the driving amount output calculated by the feed forward calculator.

7. The camera device according to claim 6, wherein the feed forward calculator stops calculation on the target position signal when the focus lens stands by at a certain position.

8. The camera device according to claim 1, wherein the lens drive unit includes a linear motor.

9. The camera device according to claim 8, wherein a resonant frequency band existing in the lens drive unit exists in an audible frequency range.

10. An interchangeable lens device detachably attached to an interchangeable lens type camera main body including an imaging element for generating image data by performing photoelectric conversion, the interchangeable lens device comprising:
a focus lens that adjusts a focus position of an object whose image is formed on an imaging surface of the imaging element;
a lens drive unit that drives the focus lens forward and backward along an optical axis of the interchangeable lens device;
a position detector that detects a lens position of the focus lens on the optical axis; and
a lens controller that controls the lens drive unit,
wherein the lens controller includes:
a driving amount calculator that samples, for each first time period, a lens position signal indicating the lens position detected by the position detector and a target position signal indicating a target position of the focus lens on the optical axis, the target position signal being transmitted from the camera main body and calculates a driving amount output of the focus lens by the lens drive unit based on the sampled lens position signal and target position signal;
an up-sampling unit that performs up-sampling on the driving amount output obtained by the driving amount calculator at a second time period which is a period obtained by dividing the first time period by an integer; and
a resonance suppression calculator that performs calculation on a result obtained by sampling the driving amount output at the second time period to suppress a higher-order resonant frequency component in a specified resonant frequency band.

11. The interchangeable lens device according to claim 10, wherein the resonance suppression calculator sets a cut-off frequency for cutting off the higher-order resonant frequency component to lower than or equal to ½ of a sampling frequency that is an inverse of the second time period and performs digital filter calculation processing having characteristics that cause frequencies lower than the cut-off frequency to pass through.

12. The interchangeable lens device according to claim 11, wherein the resonance suppression calculator obtains the driving amount output by performing the digital filter calculation processing to be a primary IIR filter form at primary low-pass filter characteristics, on a calculation value obtained when sampling is performed at the second time period.

13. The interchangeable lens device according to claim 11, wherein
the resonance suppression calculator is an FIR filter type digital filter, and
the resonance suppression calculator obtains the driving amount output of the focus lens by averaging a calculation value sampled at the second time period and a calculation value sampled at the previous time period.

14. The interchangeable lens device according to claim 11, wherein
the lens controller includes
a parameter change unit that changes a setting value of a cut-off frequency band for cutting off the resonant frequency band based on an instruction signal transmitted from a control unit that controls an image capturing operation when the camera main body captures an image.

15. The interchangeable lens device according to claim 10, wherein
the driving amount calculator includes:
a feedback calculator that calculates a control amount for adjusting the driving amount output by the lens drive unit based on a difference between the lens position signal and the target position signal;
a feed forward calculator that calculates the driving amount output by the lens drive unit based on the target position signal while the focus lens is moving; and
an adder that outputs the driving amount output obtained by calculating a sum of the control amount calculated by the feedback calculator and the driving amount output calculated by the feed forward calculator.

16. The interchangeable lens device according to claim 15, wherein the feed forward calculator stops calculation on the target position signal when the focus lens stands by at a certain position.

17. The interchangeable lens device according to claim 10, wherein the lens drive unit includes a linear motor.

18. The interchangeable lens device according to claim 17, wherein a resonant frequency band existing in the lens drive unit exists in an audible frequency range.

19. A camera main body to which the interchangeable lens device according to claim 10 is detachably attached, the camera main body comprising:
a control unit that acquires an image signal by driving and controlling the imaging element and calculates a control amount with respect to the interchangeable lens device;
an image capturing condition selection unit that selects either one of still image capturing and moving image capturing; and
a main body communication unit that transmits a control signal outputted from the control unit to the interchangeable lens device based on a calculation result by the control unit and receives a control signal outputted from the interchangeable lens device,
wherein the control unit calculates a control amount including a target position to which the focus lens in the interchangeable lens device is moved, an amount of reciprocal movement of the focus lens with the target position at a center of the reciprocal movement, and a period of the reciprocal movement, outputs the control amount to the main body communication unit, and acquires lens position information indicating a current lens position of the focus lens on an optical axis from the interchangeable lens device through the main body communication unit,
the control unit acquires the lens position information from the interchangeable lens device through the main body communication unit in synchronization with a frame rate of the image data generated by the imaging element when the camera main body captures a moving image, calculates the control amount, and outputs the control amount to the interchangeable lens device, and
the control unit transmits a control signal to change a setting of a cut-off frequency band for cutting off a resonant frequency band of the interchangeable lens device, to the interchangeable lens device through the main body communication unit.

20. A focus control method performed by a camera system which includes a camera main body having an imaging element for generating image data by performing photoelectric conversion and includes an interchangeable lens device which is detachably attached to the camera main body and has a focus lens that adjusts a focus position of an object whose image is formed on an imaging surface of the imaging element and a lens drive unit that moves the focus lens forward and backward along an optical axis, the focus control method comprising:
a position detection step of detecting a lens position of the focus lens on the optical axis;
a driving amount calculation step of sampling, for each first time period, a lens position signal indicating the lens position detected by the position detection step and a target position signal indicating a target position of the focus lens on the optical axis, the target position signal being transmitted from the camera main body and calculating a driving amount output indicating a driving amount of the focus lens by the lens drive unit based on the sampled lens position signal and target position signal;
an up-sampling step of performing up-sampling on the driving amount output calculated by the driving amount calculation step at a second time period which is a period obtained by dividing the first time period by an integer; and
a resonance suppression calculation step of performing calculation on the driving amount output up-sampled by the up-sampling step to suppress a higher-order resonant frequency component in a specified resonant frequency band.

* * * * *